US012367456B2

(12) United States Patent
Kaiser et al.

(10) Patent No.: US 12,367,456 B2
(45) Date of Patent: Jul. 22, 2025

(54) ORDER MANAGEMENT SYSTEM DETERMINING FULFILLMENT PLANS BASED ON ITEM-CLUSTER AVAILABILITY

(71) Applicant: Target Brands, Inc., Minneapolis, MN (US)

(72) Inventors: Nicholas Kaiser, Minneapolis, MN (US); Kumaran Malli, St. Paul, MN (US); Sultan Ahmed, Karnataka (IN); Manish Hasija, Karnataka (IN); Vinay Patil, Karnataka (IN); Venkatesh Sekar, Karnataka (IN); Pankaj Sinha, Karnataka (IN); Nishant Vyas, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 488 days.

(21) Appl. No.: 17/852,075

(22) Filed: Jun. 28, 2022

(65) Prior Publication Data
US 2023/0419250 A1 Dec. 28, 2023

(51) Int. Cl.
*G06Q 10/087* (2023.01)
*G06Q 10/10* (2023.01)

(52) U.S. Cl.
CPC .................. *G06Q 10/087* (2013.01)

(58) Field of Classification Search
CPC .................................................. G06Q 10/087
See application file for complete search history.

(56) References Cited

U.S. PATENT DOCUMENTS

| 8,341,036 B2 | 12/2012 | Hartman et al. |
| 8,620,707 B1* | 12/2013 | Belyi .................... G06Q 10/087 |
| | | 705/28 |
| 10,282,694 B2 | 5/2019 | Jones et al. |
| 11,868,934 B1* | 1/2024 | Mandal ................. G06N 20/10 |
| 2012/0233028 A1* | 9/2012 | Brown ................. G06Q 10/087 |
| | | 705/28 |
| 2018/0012158 A1* | 1/2018 | Cholewinski ...... G06Q 10/0633 |

(Continued)

OTHER PUBLICATIONS

Berthene,April, Target quietly rolls out order consolidation (https://www.digitalcommerce360.quietly-rolls-out-order-consolidation/), Digital Commerce 360/Vertical Web Media LLC, Dated: 2021, 6 Pages.

(Continued)

*Primary Examiner* — Garcia Ade
(74) *Attorney, Agent, or Firm* — Merchant & Gould P.C.

(57) ABSTRACT

An order management tool, method, and system are disclosed. The order management tool can use clusters of two or more locations to generate fulfillment plans for orders. The order management tool can determine whether a cluster can fulfill an order and, if so, can determine, for each item of an order, a location within the cluster from which to send the item. The items may be consolidated at a sortation center. The locations can be stores and the clusters can cover a geographical area. The order management tool can also generate two fulfillment plans, one of which allocates the order within the cluster and one of which may use one or more locations outside of the cluster, and the order management tool can apply rules to compare the two fulfillment plans and select one of them.

19 Claims, 16 Drawing Sheets

(56) References Cited

U.S. PATENT DOCUMENTS

2018/0060943 A1    3/2018  Mattingly et al.
2021/0182784 A1*  6/2021  Minh ................ G06Q 10/0835

OTHER PUBLICATIONS

Zhu, Wen, Online fulfillment: f-warehouse order consolidation and bops store picking problems, New Jersey Institute of Technology (Digital Commons @ NJIT); Dated: Dec. 31, 2020; 133 Pages.

Multi Processing—SAP Help Portal, Retrieved on Jul. 18, 2021; 4 Pages.

McKinsey & Company, Future of retail operations: Winning in a digital era (This compendum explores the breadth of change and risk throughout the modern retail industry); Dated: Jan. 2020; 104 Pages.

Leonard, Matt—Cluster analysis can help determine where to store inventory, reduce split shipments (Supply Chain Dive); Dated: Jun. 15, 2021; 5 Pages.

Consolidating Multiple Outbound Deliveries for a single Customer into One Transfer Order (Blog Post); Dated: Sep. 23, 2020; 4 Pages.

* cited by examiner

| URL | | |
|---|---|---|
| Area-Cluster Mapping | Guest Service Area | Cluster Group |

Add Mapping — 1404

| Mapping | GSA Name | Cluster Name | Mapping Details | Sortation Center |
|---|---|---|---|---|
| GSA1-Cluster1 | GSA 1 | Cluster 1 | View/Edit | 486 |
| GSA2-Cluster2 | GSA 2 | Cluster 2 | View/Edit | 535 |

1402

Area-Cluster Mapping User Interface 1400

FIG. 14

ORDER MANAGEMENT SYSTEM DETERMINING FULFILLMENT PLANS BASED ON ITEM-CLUSTER AVAILABILITY

BACKGROUND

An order, such as an order of items online from a retailer, may contain multiple items. Fulfilling the order may require determining where those items are to be sent from. For example, given a destination, and given that an item may be available in various locations, it must be determined which of the various locations to ship the item from. In the retail context, for example, a retailer may receive an order for products to be shipped to a residence. In some instances, the retailer may have one or more of the products available at different locations. In such a situation, the retailer must determine, among other things, which location—or locations—to provide the items from.

There are various complications involved in determining one or more origin locations for fulfilling an order. One complication is inventory constraints. For example, a location may not have a required item, or the location may have some, but not all, of the items of the order. Another complication is that selecting one origin location instead of another may affect cost, time, or throughput within a supply chain. For example, although shipping from one location may be faster or may require less packaging, it may also be more expensive, or vice-versa. In other words, there may not be, in some instances, an origin location for each item that is optimal for all supply chain metrics. Another complication when determining origin locations is that carriers may have certain constraints or pricing models. For example, a particular carrier may only ship a certain number of packages over a certain distance, or the carrier may charge differently depending on whether multiple stops are required or multiple packages are being shipped. Thus, selecting one origin location over another may, among other things, impact carrier availability or cost.

SUMMARY

In general, the subject matter of the present disclosure relates to an order management tool. More specifically, the subject matter of the present disclosure relates to a tool that generates a fulfillment plan for an order based on a clustering of locations.

In an example aspect, an order management tool comprises a processing unit and a memory communicatively connected to the processing unit, the memory storing instructions executable by the processing unit wherein the instructions, when executed by the processing unit, cause the processor to: receive logistics data; receive an order comprising one or more items; and generate, using the logistics data, a fulfillment plan for the order; wherein the logistics data comprises a plurality of locations; wherein two or more locations of the plurality of locations belong to a cluster; and wherein generating, using the logistics data, the fulfillment plan for the order comprises: determining whether the cluster fulfills the order; and in response to determining that the cluster fulfills the order, selecting, for each of the one or more items, one of the two or more locations belonging to the cluster as an origin location for the item.

In a second aspect, a method for managing orders is disclosed. The method comprises receiving logistics data, the logistics data comprising a plurality of clusters, wherein each cluster of the plurality of clusters covers a geographical area and each cluster of the plurality of clusters comprises two or more locations; receiving an order comprising one or more items and a customer delivery location; determining whether the order is local; in response to determining that the order is local, selecting one of the plurality of clusters based on the customer delivery location, wherein a geographical area of the selected cluster includes the customer delivery location; determining whether the selected cluster fulfills the order; and in response to determining that the selected cluster fulfills the order, selecting, for each of the one or more items, one of the two or more locations belonging to the cluster as an origin location for the item.

In a third aspect, a system for determining a fulfillment plan for delivery orders includes a planning system; a checkout system; a fulfillment system; and an order management tool. The order management tool comprises a processor and a memory, the memory storing instructions that, when executed by the processor, cause the processor to: receive logistics data from the planning system; receive an order from the checkout system, the order comprising one or more items; generate, using the logistics data, a fulfillment plan for the order; and transmit the fulfillment plan to the fulfillment system; wherein the logistics data comprises a plurality of locations; wherein two or more locations of the plurality of locations belong to a cluster; and wherein generating, using the logistics data, the fulfillment plan for the order comprises: determining whether the cluster fulfills the order; and in response to determining that the cluster fulfills the order, selecting, for each of the one or more items, one of the two or more locations belonging to the cluster as an origin location for the item.

BRIEF DESCRIPTION OF THE DRAWINGS

FIG. 14 illustrates an example area-cluster mapping user interface.

DETAILED DESCRIPTION

Figure 1:
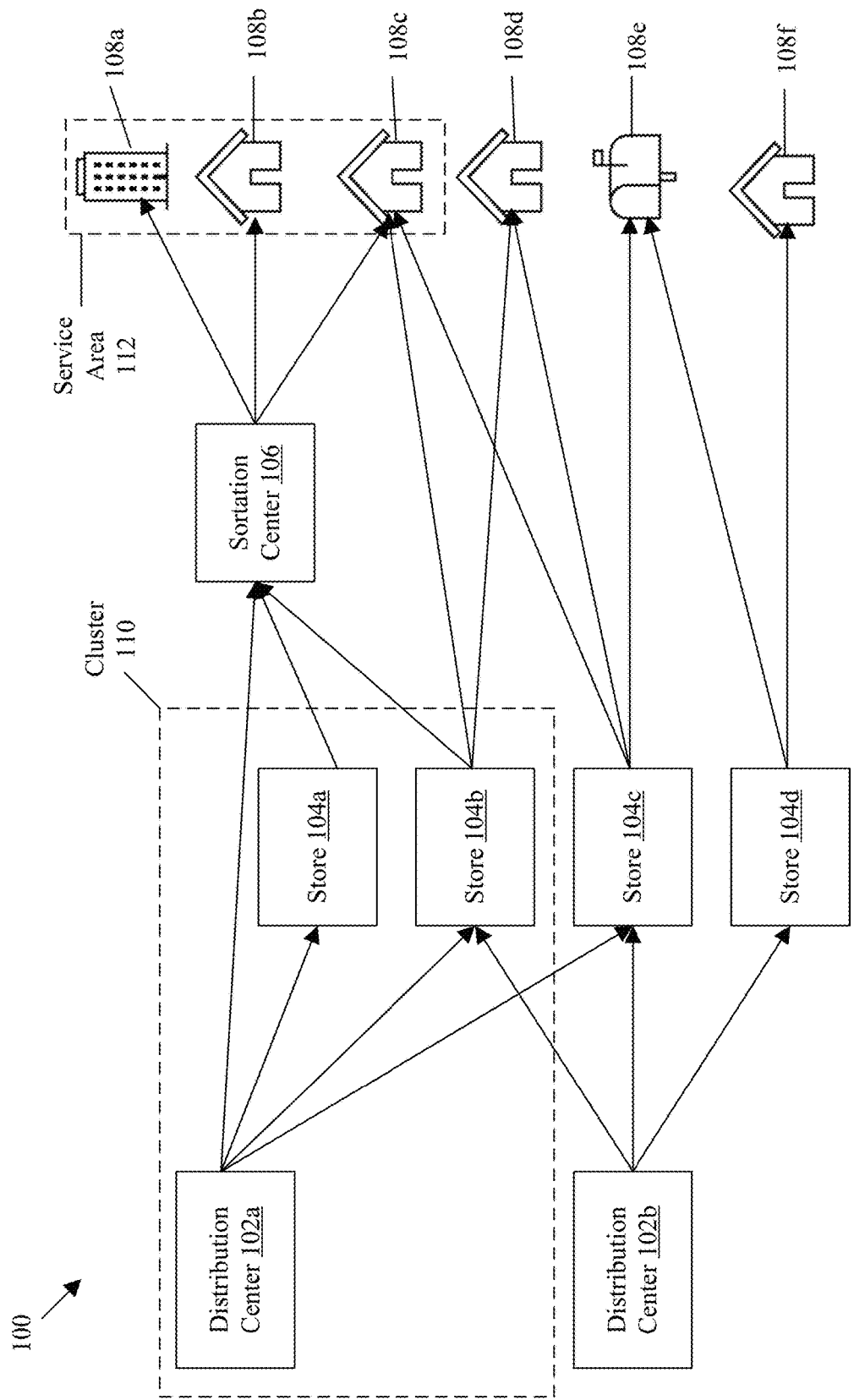
FIG. 1 illustrates a block diagram of an example retail supply chain.

As briefly described above, aspects of the present disclosure relate to a tool that can determine fulfillment plans for orders. In some embodiments, the order management tool can use logistics data. The logistics data can include information related to a plurality of locations of a supply chain. For each of the locations, the logistics data may indicate the location type, its geographic location, its inventory, its capacity, or other data. The locations may be, for example, stores, distribution centers, or other locations that can store, process, sort, or ship items.

In example aspects, a cluster can be a grouping of two or more of the locations. Additionally, the cluster can cover a certain geographical area, which can be, for example, a set of ZIP codes. Furthermore, the cluster can be mapped to a consolidation location, which can be, for example, a sortation center. A sortation center can be, for example, a location at which items are consolidated, mixed, or sorted, and from which items are shipped to a subsequent destination (also referred to as a "consolidation point"). In some examples, a sortation center receives items for consolidation and sorting from upstream retail locations within a retail supply chain. In some embodiments, the order management tool can include a user interface. Via the user interface, a user can, for example, configure a cluster, alter aspects of the logistics data, or define rules or parameters for use by the order management tool.

In example aspects, the order management tool can, in response to receiving an order, determine how to fulfill the order. The order may include one or more items. The order management tool can determine which location—or locations—to ship the one or more items from. As part of this determination, the order management tool can determine whether an order is within a service area associated with a cluster. The service area can be, for example, a certain geographical area. In some examples, the geographical area can be a certain metropolitan area. In other examples, the geographical area can be larger or smaller than a certain metropolitan area, ranging from a larger geographical region (e.g., a multi-state region or a region that goes beyond a metropolitan area) to a smaller part of a metropolitan area (e.g., a neighborhood of a city).

In example aspects, if the order is within a service area of a cluster—however the service area is defined—then the order management tool can determine whether the cluster can fulfill the order. To do so, the order management tool can, in some examples, determine whether each item of the order is available in at least one of the cluster's locations and whether the items can be ready for shipment within a certain time. In some embodiments, if a cluster can fulfill an order, the order management tool can generate a fulfillment plan, which may be sent to a downstream fulfillment system. The fulfillment plan may, for example, indicate that each item of the order is to be sent from a location within the cluster to a sortation center associated with the cluster. The sortation center may receive, consolidate, and sort the items. In some embodiments, the order management tool can also send a response to an entity that placed the order.

In example aspects, if a cluster cannot fulfill an order, the order management tool may generate a fulfillment plan for the order by using locations outside of the cluster. For example, if an item of the order is not available at any location within the cluster, the order management tool can search for a location, for example outside of the cluster, at which all the items are available. In other examples, the order management tool may determine that the cluster can, in fact, fulfill the order, but the order management tool may nevertheless determine whether a location outside of the cluster can also fulfill the order. The order management tool can then compare one or more fulfillment plans, one of which uses only locations within the cluster, and another of which may also use locations outside of the cluster. The comparison may be based on considerations such as shipping costs, speed, throughput at a location, a required number of packages, carrier pricing or requirements, or other considerations. Based on the comparison, among other things, the order management tool can select one of the fulfillment plans and can, in some examples, send the selected fulfillment plan to a fulfillment system.

Certain embodiments of the present disclosure have technical features that make them particularly advantageous over existing tools. For example, in the technical field of supply chain management, aspects of the present disclosure can, in some embodiments, reduce shipping costs and times, improve labor efficiency, and provide supply chain managers more flexibility and control over the flow of goods, including more control and better performance in last mile delivery. More generally, aspects of the present disclosure may provide supply chain managers more control in responding to and planning for operational constraints (e.g., labor costs and time, facility capacity, shipping capacity and costs, fluctuations in shipping volume) across time in a supply chain.

Aspects of the present disclosure may, in some instances, allow a supply chain manager to leverage strengths of a supply chain network having, for example, many stores. From a supply chain management perspective, the strengths of these stores may include, for example, that they may be numerous, may have inventory, and may be located near customer shipment locations. By clustering these locations and associating them with a consolidation point, such as a sortation center, aspects of the present disclosure can leverage the built-in inventory and geography of these locations. For example, aspects of the present disclosure can enable the use of local stores for efficient fulfillment of local orders, thereby improving, for example, last mile delivery.

Furthermore, beyond the advantages for fulfilling local orders, aspects of the present disclosure may provide numerous other advantages. For example, because the items of an order can, in some embodiments, be consolidated, a single carrier can, in some embodiments, make a single stop to pick up the items and a single stop to drop off the items— even if the items came from different locations—resulting in decreased shipping costs and improved shipping times, thereby enabling more shipping strategies such as same-day or two-day shipping. Relatedly, by using aspects of the present disclosure, a retailer or supplier may have more flexibility when selecting a carrier or determining a pricing model with the carrier. Additionally, by, for example, integrating logistics data, configuring aspects of the logistics data, receiving and responding to orders, generating fulfillment plans, and outputting data to fulfillment systems, aspects of the present disclosure can, in some embodiments, improve and automatically operate as an important and efficient cog in a larger digital order fulfillment system and supply chain system. Therefore, aspects of the present disclosure can, in some embodiments, save computing time and serve as a supply chain management tool that can reduce costs, reduce delivery times, and provide supply chain managers with the ability to, for example, flexibly and efficiently fulfill orders. As will be apparent, these are only some of the advantages offered by the invention of the present disclosure.

FIG. 1 illustrates a block diagram of an example supply chain 100. An entity can use the supply chain 100 to, for example, transport a product from a retailer to a customer. In the example of FIG. 1, the supply chain 100 includes distribution centers 102a-b, stores 104a-d, a sortation center 106, and customer delivery locations 108a-f. In other examples, the supply chain 100 can include a different configuration of the entities shown in FIG. 1 or can include more or less entities than those shown in FIG. 1. For example, the supply chain 100 can also include locations that come before the distribution centers 102a-b or intermediate locations situated between the entities shown in the example of FIG. 1. Via the supply chain 100, items can move, for example, from the distribution centers 102a-b to the customer delivery locations 108a-f, passing, for example, through one or more of a store, a sortation center, or another location. Depending on how the supply chain is operated, there can be different requirements, constraints, and goals at each phase in the supply chain.

In some embodiments, the stores 104a-d can be retail stores having physical locations. As briefly described above, the sortation center 106 can be a physical location that receives items from a plurality of locations, consolidates these items, and sorts them for efficient delivery to a subsequent location. In some examples, the sortation center 106 can be in the same metropolitan area (or other area of relatively higher population density) as one or more other locations of the supply chain, such as, in the example of FIG. 1, the distribution center 102a and the stores 104a-b. In some embodiments, the distribution centers 102a-b, the stores 104a-d, and the sortation center 106 can be owned and operated by the same entity. The customer delivery locations 108a-f can be, for example, residences, office buildings, post office boxes, work sites, or any other location that an item can be delivered to.

As is further shown in the example of FIG. 1, a cluster can include two or more locations. For example, the distribution center 102a and the stores 104a-b can form the cluster 110. In some embodiments, a majority of the locations that make up the cluster 110 can be retail stores. As is further described below, the cluster 110 can also be associated with a sortation center, such as the sortation center 106. In some examples, the sortation center 106 can also be part of the cluster 110. The cluster 110 may cover a particular area, such as the service area 112. In some embodiments, the one or more locations of the cluster 110 can send items to destinations within the service area 112. The service area 112 can be, for example, a geographically defined area that may include one or more customer delivery locations. In some examples, the service area 112 can be defined by a set of ZIP codes. In some embodiments, the cluster 110 and the sortation center 106 can be geographically nearby the service area 112. For instance, the locations within the cluster 110, the sortation center 106, and the service area 112 may all be within the same metropolitan area. In other examples, the locations within the cluster 110, the sortation 106, and the service area 112 may not all be in the same metropolitan area. For example, they may be spread out over a larger geographic region, or they may be associated with one another based not on proximity, but rather based on another characteristic relevant to supply chain operations, such as inventory of the locations, capacity constraints (e.g., storing, processing, or labor constraints), or cost considerations. As described below, aspects of the present disclosure allow a user to flexibly define a cluster and flexibly define a service area associated with a cluster; thus, a user can, for example, associate a cluster with a service area based on a variety of considerations, including belonging to the same local area, belonging to a larger geographic region, or based on other considerations.

Figure 2:
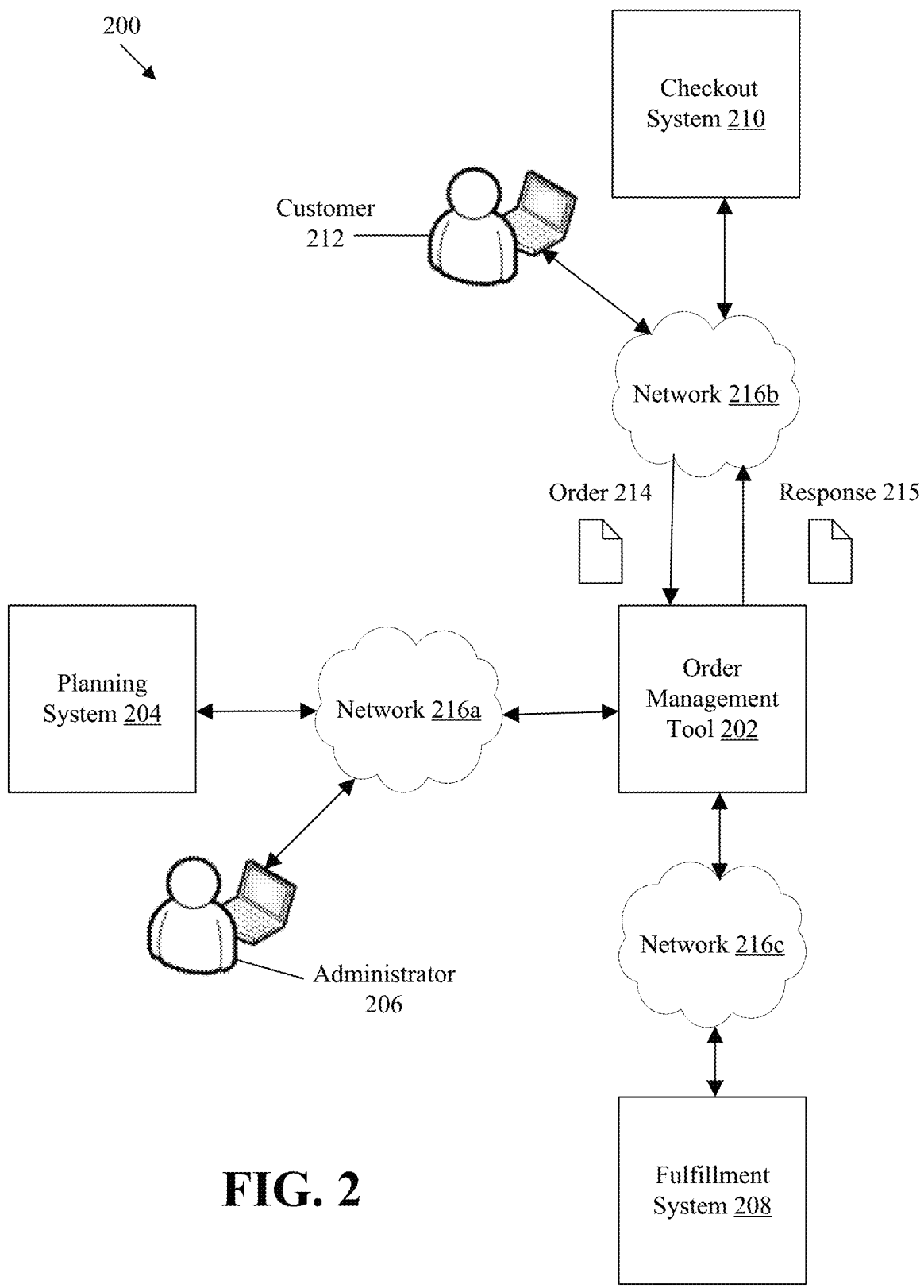
FIG. 2 illustrates an example network in which aspects of the present disclosure can be implemented.

FIG. 2 illustrates an example network 200 in which aspects of the present disclosure can be implemented. The network 200 can include an order management tool 202, a planning system 204, an administrator 206, a fulfillment system 208, a checkout system 210, and a customer 212. As shown, the network 216a couples the planning system 204 and the administrator 206 with the order management tool 202; the network 216b couples the checkout system 210 and the customer 212 with the order management tool 202; and the network 216c couples the fulfillment system 208 with the order management tool 202. Each network of networks 216a-c can be, for example, a wireless network, a wired network, a virtual network, the Internet, or any other type of network. Furthermore, each network of the networks 216a-c can be divided into subnetworks, and the subnetworks can be different types of networks or the same type of network.

The order management tool 202 can manage how at least some orders are to be fulfilled. For example, as is further described below, the order management tool 202 can determine one or more origin locations for items of an order. An origin location can, in some examples, be a location from which an item is shipped. For example, a store or distribution center that sends an item to a customer residence may be an origin location. To determine one or more origin locations for items of an order, the order management tool 202 can, for example, use logistics data.

The logistics data, which can be a computer-readable file, data structure, or object, can have data related to locations in a supply chain. The locations can be, for example, the locations illustrated in FIG. 1, such as distribution centers, stores, sortation centers, or other locations. In some embodiments, the logistics data may not include customer delivery locations, instead only including data related to locations that can, for example, store, ship, process, or sell items. In some embodiments, a majority of the locations within the logistics data are retail stores. Additionally, the logistics data can include data related to the locations, such as their geographic locations, their inventory, their throughput capacity, and other data. In some embodiments, the logistics data can indicate that two or more locations belong to a cluster.

In example implementations, the logistics data can include realtime inventory information. For example, in such implementations, at a time an origin location is to be determined, the order management tool 202 may access inventory information for items of the order, to determine where such items are available in stock to be shipped to the customer delivery location.

In some embodiments, the logistics data can include one or more clusters. A cluster can be a group of two or more locations. In some examples, a user, such as the administrator 206 can define a cluster via a user interface of the order management tool 202. Using the logistics data, including the one or more clusters, the order management tool 202 can, in response to receiving an order, generate a fulfillment plan for the order. As is further described below, the fulfillment plan can be a set of data or information related to fulfilling an order. For example, in some embodiments, the fulfillment plan can be a computer-readable file, data structure, or object that includes data or instructions related to fulfilling the order. In some examples, the fulfillment plan may be an electronic message provided to an order fulfillment system, such as fulfillment system 208, which, in response, initiates shipment of the items in the order to the customer location, and updates inventory levels at selected shipping locations identified in the fulfillment plan.

The planning system 204 can, in some embodiments, include databases storing data related to a supply chain. For example, the planning system 204 can have data related distribution centers, stores, sortation centers, carriers, item demand, demand by region, and other data. In some embodiments, the planning system 204 can structure some of this data and send it to the order management tool 202 as the logistics data. Furthermore, in some embodiments, the planning system 204 can define one or more clusters and send the one or more clusters to the order management tool 202 as part of the logistics data. The administrator 206 can, in some examples, use the planning system 204 or the order management tool 202 to modify data related to order management or the supply chain. For example, in some embodiments, the administrator 206 can use a user interface of the order management tool 202 to define a cluster, modify logistics data, alter parameters used by the order management tool 202 (e.g., rules related to determining whether to generate multiple fulfillment plans or rules related to selecting a fulfillment plan), or perform other actions related to supply chain management.

The entities 210-212 can, in some embodiments, send an order 214 to the order management tool 202. The checkout system 210 can be, for example, a system that operates in conjunction with a website or mobile application to facilitate orders. In some embodiments, the customer 212, who may be using a mobile device or another computer system, may place an order or a prospective order that is received by the order management tool 202. When sending an order 214, both the checkout system 210 and the customer 212 can be associated with a user device. The user device may be, for example, a device that a user is using to access the checkout system 210, or a device that is being used by the customer 212.

In some examples, the customer 212 places the order through the checkout system 210. The order 214 can include one or more items. For example, in the retail context, the order 214 can include one or more products offered for sale by the retailer on, for example, the retailer's website, mobile application, or catalog. Furthermore, the order 214 can include payment information and information related to the delivery of the one or more items, such as an address and date by which the one or more items must be delivered. In response to receiving the order, the order management tool 202 can, for example, allocate the order across one or more locations. Furthermore, the order management tool 202 can generate a response 215 that the order management tool 202 can return to one or more of the entities 210-212. The response can indicate, for example, a confirmation, an estimated delivery date, an estimated delivery time, an estimated number of packages that will be sent, a receipt, or other data related to fulfilling the order 214.

In some examples, the order 214 can be a prospective order, for example if the customer 212 has one or more items in a cart on a retail website or mobile application. In such an example, the order management tool 202 can determine how to fulfill the prospective order. For example, the order management tool 202 can, in some embodiments, generate a fulfillment plan for the prospective order, as is further described below, but the order management tool 102 would not send the fulfillment plan to a downstream system. Furthermore, in the case of a prospective order, the response 215 can include, for example, a date that the prospective order would be fulfilled if the order were placed. In some examples, in response to receiving the estimated delivery date or a promise date, one or more of the entities 210-212 may then place an actual order, which can be received by the order management tool 202.

The fulfillment system 208 can, in some examples, receive a fulfillment plan for an order from the order management tool 202. The fulfillment system 208 can be a downstream system, and it can be related to executing the delivery of one or more items of the order. For example, the fulfillment system 208 can be a system associated with one of the locations that are sending or processing one or more items of the order, such as stores, distribution centers, vendors systems, or other locations. Additionally, the fulfillment system 208 can be a system associated with a carrier performing the delivery of the one or more items. In some embodiments, the network 200 can include a plurality of fulfillment systems 208, each of which can be coupled to the order management tool 202. Furthermore, the order management tool 202 can, in some embodiments, transmit the fulfilment plan, or aspects of the fulfillment plan, to other systems, such as analytics systems, payments systems, or other systems or programs.

Figure 3:
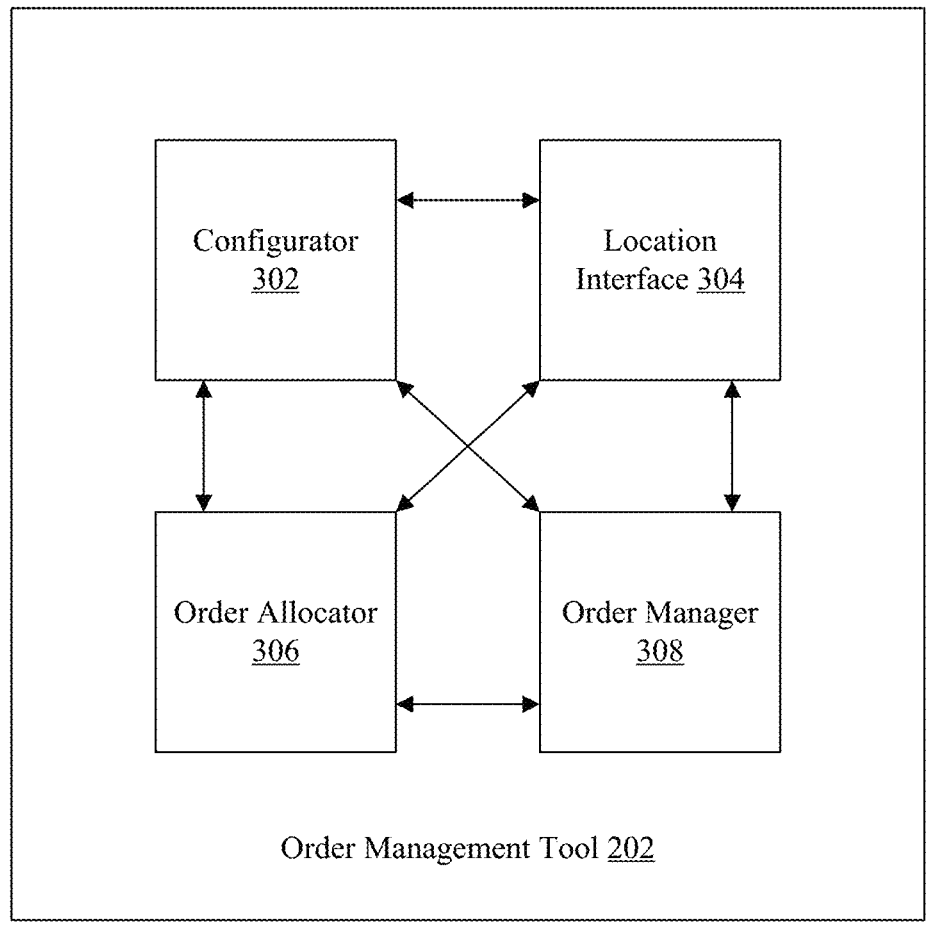
FIG. 3 illustrates a block diagram of an example architecture of an order management tool.

FIG. 3 illustrates a block diagram of an example architecture of the order management tool 202. In the example of FIG. 3, the order management tool 202 includes a plurality of subsystems, including a configurator 302, a location interface 304, an order allocator 306, and an order manager 308. In some embodiments, the subsystems of the order management tool 202 can, as shown, be communicatively coupled with one another and with other systems depicted in the network 200 of FIG. 2. As further described below in connection with FIG. 16, the subsystems of the order management tool 202 may include a memory and a processor that can execute instructions stored in the memory. In the example of FIG. 3, the subsystems of the order management tool 202 are described as performing various functions. In other embodiments, the subsystems can perform more or less functions than those described. Furthermore, in some embodiments, the subsystems may overlap, or the functionality of the subsystems may overlap.

In some embodiments, the configurator 302 can, for example, configure logistics data, rules or parameters useable by the order management tool 202, or other aspects of the present disclosure. In some examples, the configurator 302 can include one or more user interfaces, which can include, for example, one or more input fields for configuring aspects of the order management tool 202, the logistics data, or other aspects of the present disclosure. For example, by using the configurator 302, a user can group one or more locations, such as stores, into a cluster. Furthermore, using the configurator 302, a user can define a service area covered by a cluster. As discussed above in connection with FIG. 1, the service area can be a geographical region that locations belonging to a cluster can send items to. To define the service area, a user can, in some examples, input ZIP codes into a user interface of the configurator 302; in other examples, the service area can be defined in other ways, such as time or distance from a particular location. In other examples, the configurator 302 may automatically define clusters based on density of locations, such as stores, within a geographical area, or based on presence of a sortation center within that geographical area, or a combination thereof.

Additionally, the configurator 302 can set rules that are useable by other subsystems of the order management tool 202. For example, a user can, via the configurator 302, set rules related to when the order allocator 306 should generate and compare multiple fulfillment plans, rules related to special treatment of orders when they contain certain items (e.g., special shipping rules when items are particularly heavy, bulky, or expensive), rules related to altering a fulfillment plan depending on the date (e.g., whether it is holiday season), rules related to real-time supply chain conditions, rules related to favoring speed over time (or vice-versa) depending on business considerations, rules related to particular locations or clusters, rules related to priority deliveries, or any other rules related to order fulfillment or the order management tool 202. Example user interfaces of the configurator 302 are further described below in connections with FIGS. 10-15.

The location interface 304 can, in some embodiments, interface with locations in the supply chain. For example, the location interface 304 can determine a location's inventory or expected inventory, determine the time it takes to process an item at a location, determine a transit time from one location to another, or determine other data related to locations within the supply chain. Using this data, the location interface 304 can, in some embodiments, generate a promise date for an order, for example if a user sends a prospective order to the order management tool 202. In some examples, the order management tool 102 can then send this promise date to a user. In the case where an order has been placed, the location interface 304 may provide an estimated delivery date to the user. Additionally, the location interface 304 can also provide this data to the order allocator 306.

The order allocator 306 can, for example, generate a fulfillment plan for an order by, in part, determining an origin location of each of the one or more items of the order. To do so, the order allocator 306 can, for example, use data related to locations and item availability from the location interface 304. As is further described below in connections with FIGS. 4-6, the order allocator 306 can determine whether the customer delivery location of an order is within a service area of a cluster, and if so, attempt to generate a fulfillment plan using locations within the cluster. The order allocated 304 can also, in some embodiments, generate a plurality of fulfillment plans and select one of them based on a set of rules, which can be defined, for example, via the configurator 302. As described above, the rules may, for example, indicate whether to prefer or not prefer stores within a cluster, to prefer certain metrics, such as delivery time, cost, throughput, or another metric, or indicate other requirements for fulfilling deliveries.

The order manager 308 can, for example, receive a fulfillment plan from the order allocator 306 and can, for example, update the logistics data, update databases related to the fulfillment plan, or update data used by the location interface 304. For example, if a fulfillment plan indicates that a particular store is providing one or more items for an order, then the order manager 308 can ensure that the store does not promise those same items in a different order. Furthermore, the order manager 308 can interface with one or more fulfillment systems, such as the fulfillment system 208 of FIG. 2.

Figure 4:
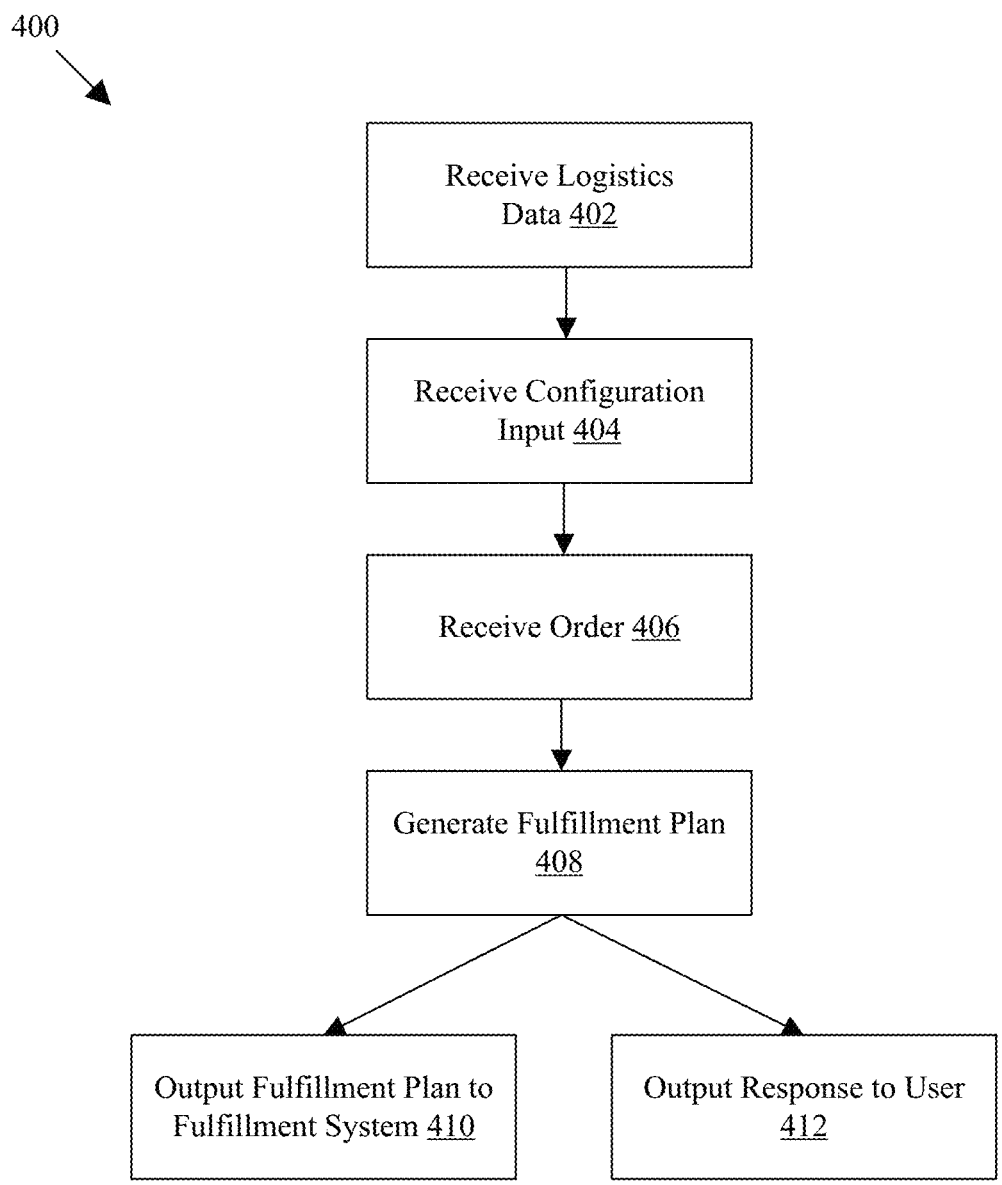
FIG. 4 is a flowchart of an example method useable by an order management tool.

FIG. 4 is a flowchart of an example method 400 useable by the order management tool 202. In the example shown, the method 400 is instantiated by receiving logistics data (Step 402). As described above, the order management tool 202 can, in some embodiments, receive the logistics data from another system, such as the planning system 204. As described above, the logistics data can include data related to a supply chain, including data related to locations within the supply chain, such as distribution centers, stores, sortation centers, destinations, or other locations. Furthermore, the logistics data can include other information related to these locations.

In the example shown, the order management tool 202 can receive a configuration input (Step 404). As described above, the order management tool 202 can receive an input, for example via a user interface of the configurator 302, to, for example, configure the logistics data, define one or more clusters, define a service area covered by a cluster, define one or more rules or parameters for use when determining whether to generate a plurality of fulfillment plans or to determine which of a plurality of fulfillment plans to select, or an input for configuring another aspect of the order management tool 202. In some examples, the logistics data may already include groupings of two or more locations into clusters, in which case the order management tool 202 may not need to configure a cluster. For example, the planning system 204 or another system may have already grouped one or more locations into a cluster.

In the example shown, the order management tool 202 can receive an order (Step 406). For example, the order can be sent by the checkout system 210 or the customer 212 of FIG. 2. As described above, the order can include one or more items. Furthermore, the order can include other information, such as a drop-off location, a required deliver-by date, or other information related to fulfilling the order. In some examples, the order management tool 202 can receive a plurality of orders, and the order management tool 202 can, depending on the embodiment, process them sequentially or in parallel. In response to receiving a plurality of orders, the order management tool 202 can, for example, repeat, for each order, the Steps 408-412, which are further described below. Furthermore, in some examples, as is described above, an order can be a prospective order, and the order management tool 202 can, rather than actually fulfilling the prospective order, determine a date by which the order could be fulfilled and send that date and other information to a user.

In the example shown, the order management tool 202 can generate a fulfillment plan (Step 408). For example, in response to receiving the order (e.g., at Step 406), the order management tool 202 can determine, among other things, where the items of the order are available and can generate a fulfillment plan based on this availability. Furthermore, the order management tool 202 can determine an estimated delivery time and an estimated delivery cost. Among other things, the fulfillment plan can indicate, for example, what location is to ship what items to where and whether there is an intermediate or consolidation location, such as a sortation center. In some examples, the consolidation location can be one of the origin locations of one or more items. For instance, one of the origin locations (e.g., a store) may have, for example, capacity to receive, sort, and store items, and that location may be selected as the consolidation location. In some embodiments, there may not be a consolidation location nor a sortation center. For example, each item of the order may be shipped directly from a location at which the item or order is located, such as a store, to a customer delivery location. In such embodiments, one or more carriers may pick up the one or more items from one or more locations and bring them to a customer delivery location. In some embodiments, the fulfillment plan can also indicate what carrier will deliver what item and when. In some examples, the fulfillment plan can include a delivery schedule containing data related to one or more deliveries of one or more items of the order.

Generating a fulfillment plan is further described below in connection with FIG. 5. Additionally, a method in which the order management tool 202 generates a plurality of fulfillment plans is discussed below in connection with FIG. 6.

In the example shown, the order management tool 202 can transmit the fulfillment plan to a fulfillment system (Step 410). As discussed above, the order management tool 202 can transmit the fulfillment plan and other data to a fulfillment system that is associated with fulfilling the order. In the example shown, the order management tool 202 can also output a response to a user (Step 412). The user can be, for example, the customer 212, the checkout system 210, or another system. As described above, the order management tool 202 can transmit an estimated delivery date, an estimated cost, a part of the fulfillment plan, or other information to a checkout system, to a customer that placed an order, or to another system.

Figure 5:
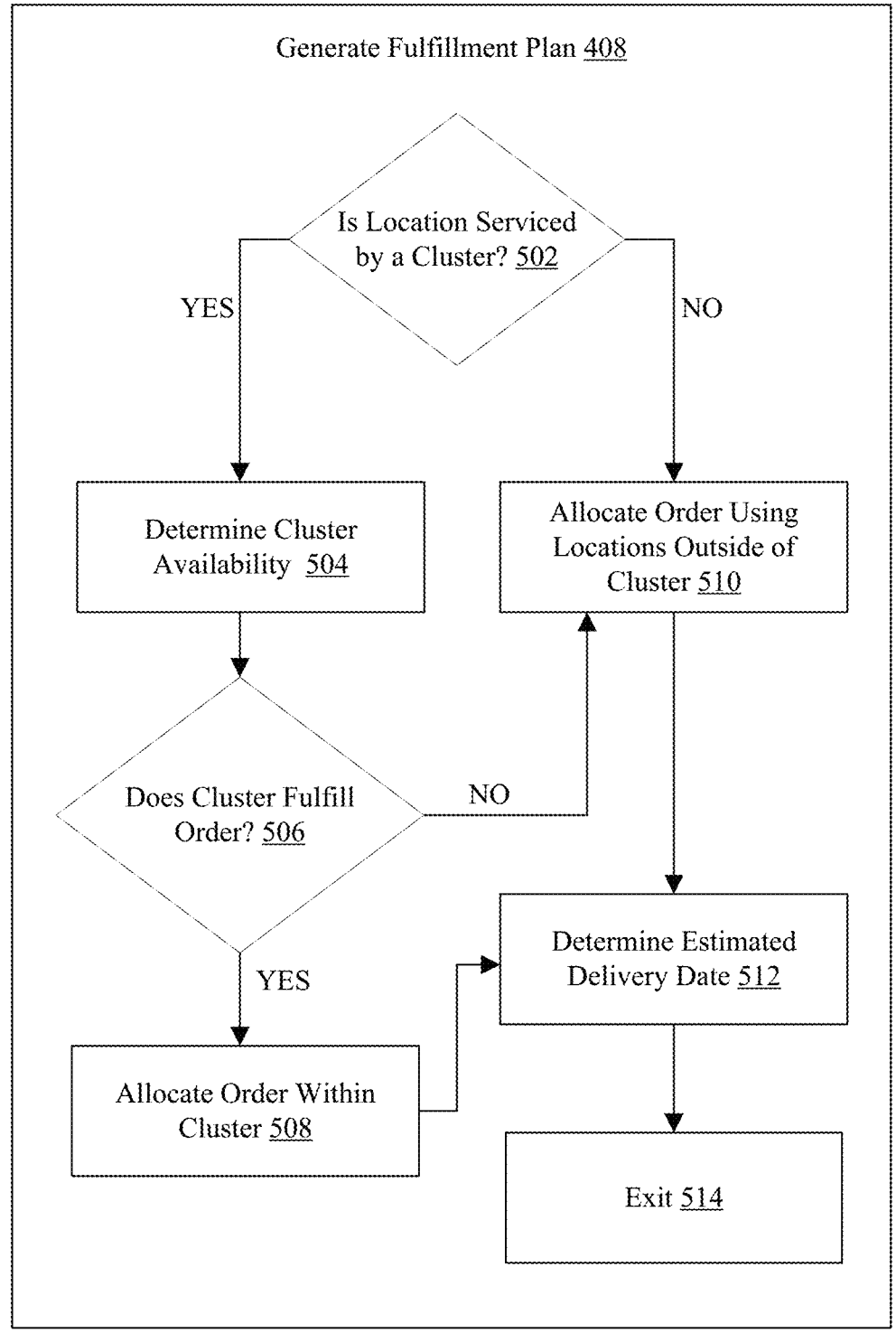
FIG. 5 is a flowchart of an example method for generating a fulfillment plan.

FIG. 5 is a flowchart of an example method 500 for generating a fulfillment plan (e.g., an example method for performing Step 408 of FIG. 4). In the example shown, the order management tool 202 can determine whether the order location is serviced by a cluster (Step 502). To do so, the order management tool 202 can, for example, determine whether the customer delivery location of the order is within a service area of a cluster. As discussed above, a cluster can be associated with a service area that encompass a geographical area. If the order has a customer delivery location within such an area of a cluster, then it can be considered to be serviced by a cluster (e.g., taking the "YES" branch to Step 504). If, on the other hand, the customer delivery location is not encompassed by any clusters, then it can be determined that the order is not serviced by a cluster (e.g., taking the "NO" branch to Step 510). In other embodiments, there can be other ways of determining whether an order is serviced by a cluster, for example by comparing the ZIP code of an order with a list of ZIP codes that are serviced by a cluster, by determining whether an order has a customer delivery location that is sufficiently close to a particular location, or another way of determining whether an order is serviced by a cluster. In some examples, the order management tool 202 can determine that an order is serviced by a cluster if the customer delivery location of the order is local to a cluster.

In the example shown, the order management tool 202 can determine a cluster availability (step 504). In some embodiments, this can be performed, at least in part, by the location interface 304 of FIG. 3. For example, the order management tool 202 can, in some embodiments, select the cluster that has a service area encompassing the customer delivery location of the order. Then, the order management tool 202 can, for each item of the order, determine which location, or locations, of the cluster have the item available. In some embodiments, the order management tool can determine an aggregate availability of items based on the two or more locations of the cluster. In some instances, more than one location within the cluster may have the item available; in other instances, none of the locations may have the item available. Additionally, for each location that has the item available, the order management tool 202 can determine when the item would be available, which can include both the time required to internally process the item (e.g., moving the item from a storage area or a shelf area to a position where it is ready to be shipped) and the transit time required to ship the item to a subsequent destination.

In the example shown, the order management tool 202 can determine whether the cluster fulfills the order (Step 506). In some embodiments, there can be one or more requirements that must be met for the cluster to fulfill the order. For example, one requirement can be that all the items included in the order are available in at least one location of the cluster. If one or more items are not available at any locations of the cluster, then the order may not be fulfilled. Furthermore, as described above, there may be other requirements too. Examples of other requirements include that items of the order be delivered within a certain time or that costs, whether they be shipping, packaging, or aggregate costs, be below a threshold amount. Furthermore, the order management tool 202 may also consider other rules, such as those set by, for example, the configurator 302. As described above, there can be a variety of such rules. As one example, a rule may state that an order is not to be allocated within a cluster if it will cause too many packages to be delivered, which could happen, for example, if too many items of the order are available only at different locations within the cluster.

If the cluster fulfills the order, by, for example, meeting all the requirements of the order, then the order management tool 202 can allocate the order within the cluster (e.g., taking the "YES" branch to Step 508). If, on the other hand, the cluster cannot fulfill the order, then the order management tool 202 can proceed to allocate the order by using one or more locations outside of the cluster (e.g., taking the "NO" branch to Step 510).

In the example shown, the order management tool 202 can allocate the order within the cluster (Step 508). To do so, the order management tool 202 can, in some embodiments, select an origin location for each item of the order. For example, the order management tool 202 can, for each of the one or more items of the order, select a location within the cluster from which to ship the item. Using these selections, the order management tool 202 can create a fulfillment plan. If two or more locations within the cluster have a particular item available, then the order management tool 202 may select one of those locations as the origin location. To do so, the order management tool 202 can, in some embodiments, select the location that can have the item available to ship within a certain time, can select the location that will result in less packages being shipped, select the location that results in cheaper shipping costs, select a location based on carrier considerations, or select a location based on other rules, which may be defined, for example, via the configurator 302.

As part of allocating the order within the cluster, the order management tool 202 may also, as discussed above in connection with the order manager 308, update data related to the cluster, related to the locations within the cluster, or related to the supply chain. Furthermore, the order management tool 202 may create a delivery schedule as part of the fulfillment plan, and the delivery schedule may indicate, for example, which locations are shipping which items and when the shipments are occurring. Furthermore, the order management tool 202 may determine, and the delivery schedule may indicate, that one or more items of the delivery are to be shipped to a consolidation point, such as a sortation center, before being shipped to a subsequent destination, which may be the customer delivery location. As discussed above, the sortation center may be part of the cluster, or the cluster may be associated with a sortation center.

In the example shown, in response to determining that an order is not serviced by a cluster, or in response to determining that a cluster cannot fulfill the order, the order management tool 202 can fulfill the order using one or more locations outside of a cluster (Step 510). For example, in some embodiments, if an order is not local, then it is not within the service area of a cluster, and locations outside of the cluster can be considered; furthermore, even if an order has a customer delivery location that could be serviced by a cluster, if the cluster cannot fulfill the order (e.g., there is an item of the order that is not available at any locations within the cluster), then locations outside of the cluster can be considered. In some embodiments, however, even if the order management tool 202 uses one or more locations outside of the cluster to fulfill the order, the order management tool 202 can still use one or more locations within the cluster as one or more origin locations for one or more items of the order.

There can be various ways to allocate an order using one or more locations outside of a cluster. For example, the order management tool 202 may determine a location that has available each item of an order and select that location as the origin location for all the items of the order. As another example, the order management tool 202 may select a plurality of locations, one of which does not belong to the cluster, to fulfill the order. In some examples, the way in which the order management tool 202 can determine how to allocate the order can depend on rules defined, for example, via the configurator 302, as described above. As part of allocating the order using one or more locations outside of the cluster, the order management tool 202 can also generate a fulfillment plan indicating, for example, which items of the order are to be sent from where and when they are to be sent.

In the example shown, having allocated the order within the cluster (e.g., at Step 508), or having allocated the order using one or more locations outside of the cluster (e.g., at Step 510), the order management tool 202 can determine an estimated delivery date (Step 512). In some examples, determining the estimated delivery date can be performed while allocating the order. The delivery time may include, for example, for each item of the order, a processing time and a transit time. The processing time can be the time required for a location to have the item ready to ship, and the transit time can be the time required to transport the item. Furthermore, the delivery time may include a plurality of processing times or transit times if, for example, the item must go through multiple locations. In some examples, the order management tool 202 can determine the estimated delivery date based on the item of the order that has the slowest delivery time. In other embodiments, the order management tool 202 can determine an estimated delivery date based on additional or different considerations. In some embodiments, the fulfillment plan can include the estimated delivery date.

Furthermore, as described above (e.g., in connection with the order 214 of FIG. 2 and in connection with Step 406 of the method 400), the order can, in some examples, be a prospective order (e.g., if a customer has added one or more items to a cart). In such an example, the estimated delivery date can be an estimated promise date (e.g., a date by which the order could be delivered if the customer were to place the prospective order). In such a situation, the same or a different process can be used to determine the promise date as is used to determine the estimated delivery date. However, as described above, the order management tool 202 may not, in some embodiments, transfer a fulfillment plan to a fulfillment system or otherwise alter other data if the order is only prospective order.

In the example shown, the order management tool 202 can finish generating the fulfillment plan (Step 514). The order management tool 202 can, for example, include any other data required in the fulfillment plan and then, for example, output the fulfillment plan to a fulfillment system (e.g., Step 410 of the method 400) and output, for example, part of the fulfillment plan as part of a response to a user (e.g., Step 412 of the method 400).

Figure 6:
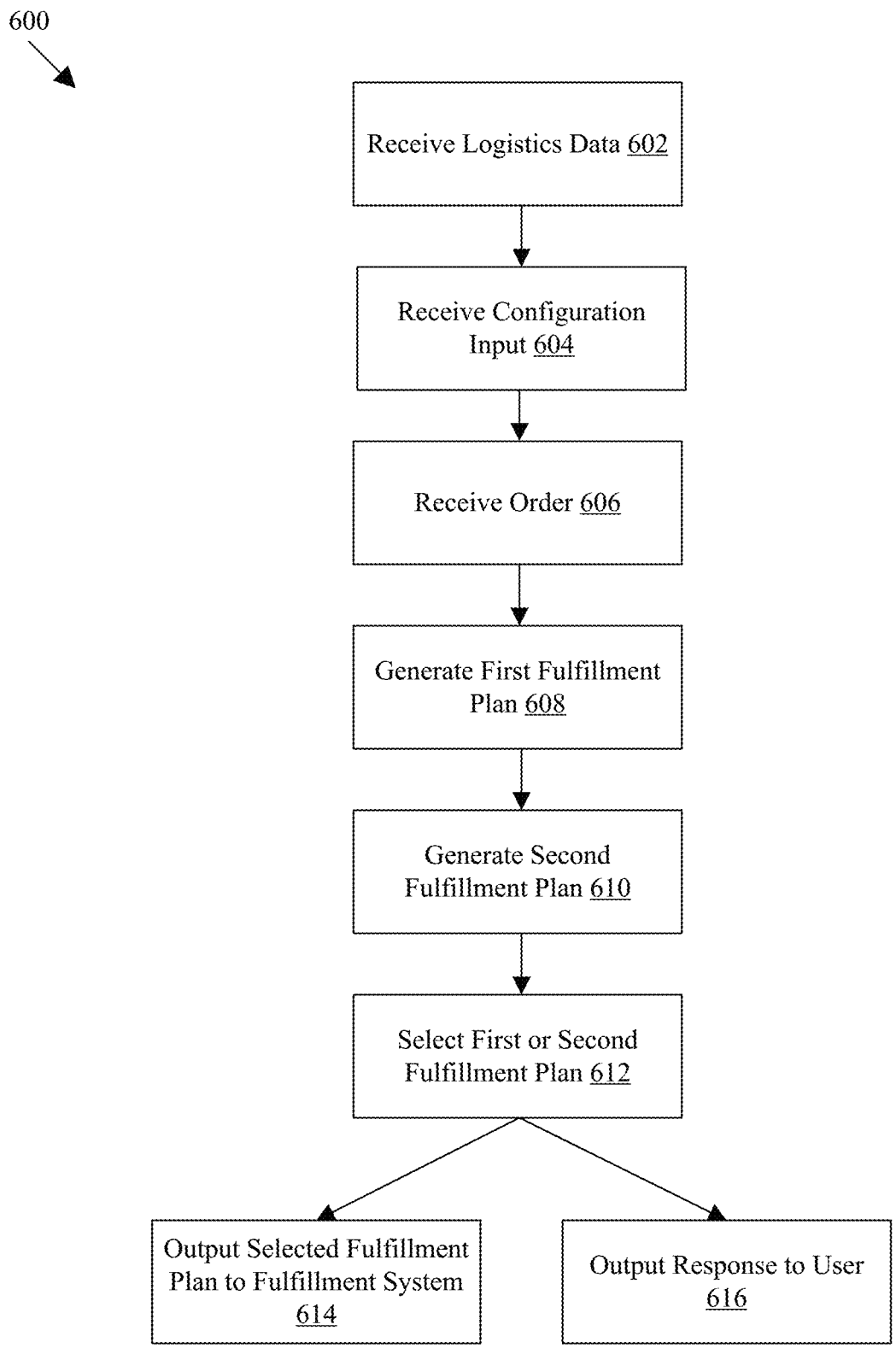
FIG. 6 is a flowchart of an example method useable by an order management tool.

FIG. 6 is a flowchart of an example method 600 useable by an order management tool 202. The method 600 can be similar to the method 400 in that the order management tool 202 can use the method 600 to use clusters to create fulfillment plans for orders. However, in example implementations, the order management tool 202 can use the method 600 to create a plurality of fulfillment plans, some of which may use clusters and some of which may not. Furthermore, the order management tool 202 can, using the method 600, select a fulfillment plan from a plurality of fulfillment plans based, for example, on certain supply chain-related metrics or business rules. For example, for certain items or under certain supply chain conditions, it may be useful, for example because of differing costs, speeds, or throughput, to alternate whether a order is fulfilled by allocating the order within a cluster or allocate the order without accounting for the cluster, even though the cluster may be able to fulfill the order. Although the order management tool 202 generates two fulfillment plans in the example of FIG. 6, the order management tool 202 can, in some embodiments, generate more than two possible fulfillment plans for an order, some of which may allocate the order within a cluster, and some of which may use one or more locations outside of a cluster.

In the example shown, the order management tool 202 can receive logistics data (Step 602), receive a configuration input (Step 604), and receive an order (Step 606). Examples of receiving logistics data, a configuration input, and an order are described above in connection with FIG. 4 (e.g., in connection with Step 402, Step 404, and Step 406).

In the example shown, the order management tool 202 can generate a first fulfillment plan (Step 608). To do so, the order management tool 202 can, for example, determine whether the order is within a service area and, if so, determine whether a cluster covering the service area can fulfill the order, as is described, for example, in connection with FIG. 5. Then, as is also described, for example, in connection with FIG. 5, the order management tool 202 can, depending on whether the order is within a service area and depending on whether the cluster can fulfill the order, generate a fulfillment plan by allocating the order across one or more locations.

In the example shown, the order management tool 202 can generate a second fulfillment plan (Step 610). To do so, the order management tool 202 can, for example, seek to fulfill the order without first determining whether the order is within a service area and without preferring to fulfill the order using locations within a cluster. For example, the order management tool 202 can, even if an order is within a service area and even if the order could be fulfilled by a cluster associated with the service area, use existing logic or other methods or systems to create a second fulfillment plan that may use one or more locations outside of the cluster.

In the example shown, the order management tool 202 can select the first fulfillment plan or the second fulfillment plan (Step 612). Furthermore, in some embodiments, the order management tool 202 can generate more than two fulfillment plans and select one of the more than two fulfillment plans. To do so, the order management tool 202 can, in some embodiments, compare the fulfillment plans. As discussed above in connection with Steps 608-610, the one or more fulfillment plans may fulfill the order using locations only within the cluster, and one or more other fulfillment plan may fulfill the order using one or more locations outside of the cluster. The order management tool 202 may apply one or more rules input via the configurator 302, described above, to compare the fulfillment plans. The order management tool 202 may compare, for example, a time or cost difference between the fulfillment plans. Furthermore, the order management tool 202 may compare how selecting one fulfillment plan over another may affect decisions related to carriers or may affect a throughput, inventory, or capacity of one or more locations. Based on these comparisons, for example, and based on other considerations, such as dynamic or fixed business rules useable by the order management tool 202, the order management tool 202 can select one of the fulfillment plans to fulfill the order. Based on the selection, the order management tool 202 can, for example, update the logistics data or other data.

In the example shown, the order management tool 202 can output the selected fulfillment plan to a fulfillment system (Step 614), and the order management tool 202 can output a response to a user (Step 616). Examples of both outputting a fulfillment plan to a fulfillment system and of outputting a response to a user are described, for example, in connection with Steps 410-412 of FIG. 4.

Figure 7:
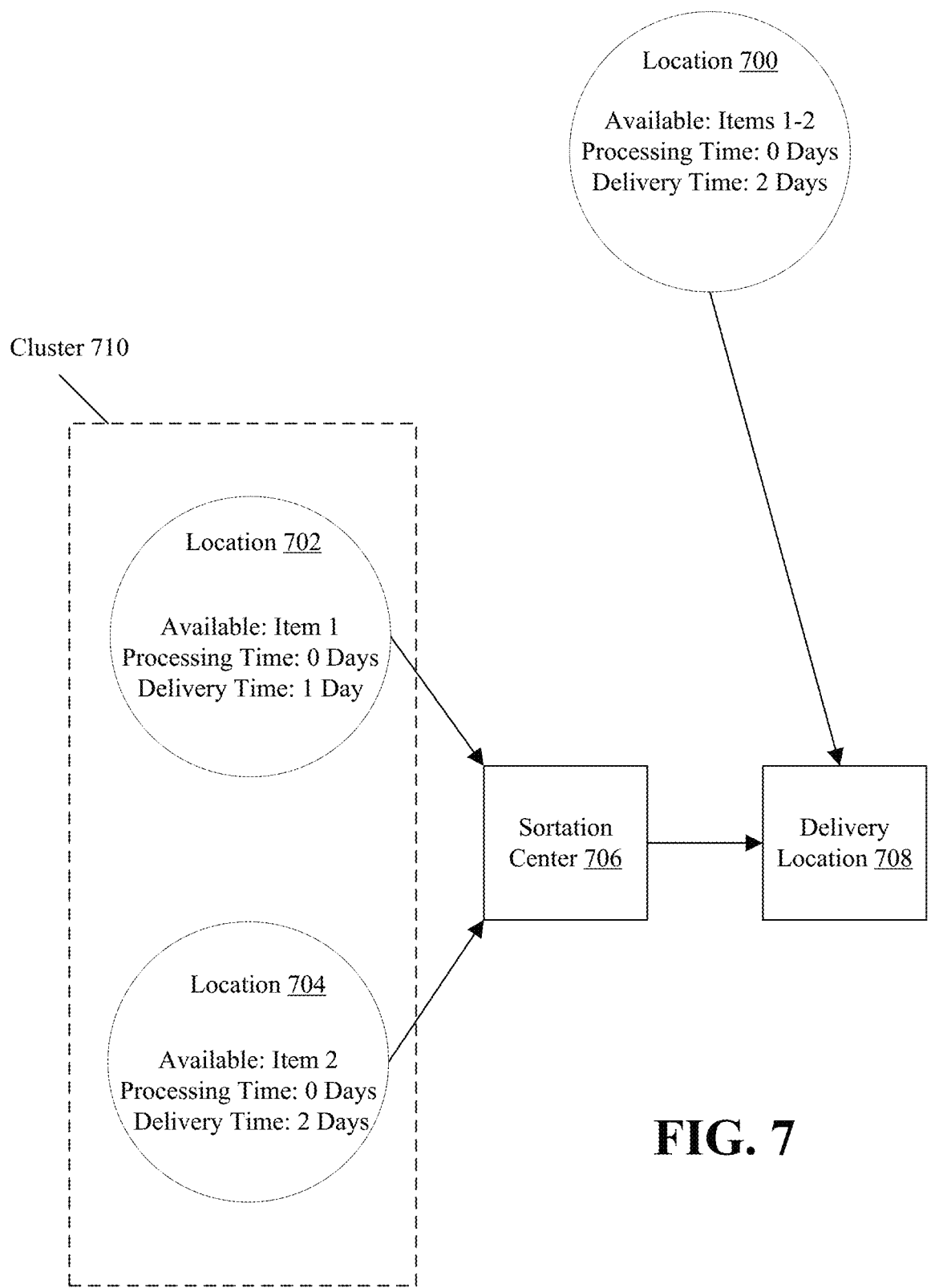
FIG. 7 illustrates a schematic diagram of an example application of aspects of the present disclosure.

FIG. 7 illustrates a schematic diagram of an example application of aspects of the present disclosure. The example of FIG. 7 includes locations 700-704, a sortation center 706, and a customer delivery location 708. In the example shown, the locations 702-704 can ship items to the sortation center 706, which can subsequently ship items to the customer delivery location 708. In the example shown, the location 700 can also ship items to the customer delivery location 708. The locations 700-704 can be stores, for example, or other locations described herein. In the example of FIG. 7, the locations 702 and 704 can form a cluster 710.

Continuing with the example of FIG. 7, the order management tool 202 may receive, for example, an order that includes Item 1 and Item 2, and that requests shipment to the customer delivery location 708. In some embodiments, the order management tool 202 can generate a fulfillment plan for the order. As described above, the order management tool 202 can determine whether the order is serviced by a cluster (e.g., by determining whether the customer delivery location 708 is within a service area associated with a cluster, such as the cluster 710). In response to determining that the order is serviced by a cluster, the order management tool can determine whether the cluster fulfills the order, which can include, for example, determining, for each item of the order, whether that item is available in at least one location of the cluster. Furthermore, another requirement of the order may be that the order is fulfilled within a maximum amount of time. As described above, the order management tool 202 can therefore determine whether each item of the order can be delivered within that maximum amount of time.

As shown, the location 702 has Item 1 and the location 704 has Item 2. Therefore, in some examples, the order management tool 202 may determine that the cluster fulfills the order and assign location 702 as the origin location for Item 1 and assign location 704 as the origin location for Item 2. The order management tool 202 can then, in some embodiments, determine that the Items 1-2 are to be shipped to the sortation center 706 and then to the customer delivery location 708. The order management tool 202 may also determine that the estimated delivery date is in two days, because, for example, two days is the slowest delivery time of the items.

In the example of FIG. 7, the processing time for the locations 702-704 is zero days. This may indicate, for example, that both locations can have their respective items ready for shipment before the end of the day; in other examples, however, the processing time for a location can be more than zero, which may mean that the location requires more time to get one or more items ready for shipment. In such a situation, the order management tool 202 may account for the increased processing time when determining an estimated delivery date. In some embodiments, the order management tool 202 may determine not to use a location as an origin location, even if the location has an item available, if the location would not have an item ready for shipment within a certain amount of time. For example, if one location could have an item to a consolidation point on the same day as the order, and another location could not have an item of the same order to the consolidation point until a day later, the order management tool 202 may, in some embodiments, elect to not select one or more of those locations in order to, for example, avoid a discrepancy regarding when items of the same order arrive at a consolidation point or customer delivery location. Avoiding such a discrepancy may be, for example, a rule defined via the configurator 302.

Continuing with the example of FIG. 7, the order management tool 202 can, as described in connection with FIG. 6, also determine a fulfillment plan using a location outside of the cluster 710, such as the location 700. The order management tool 202 can then, in some embodiments, compare the fulfillment plan using the locations within the cluster with the fulfillment plan using the outside-of-the-cluster location 700, as is described, for example, in connection with FIG. 6. Furthermore, as is also described in connection with FIG. 6, the order management tool 202 can, in some embodiments, select between a fulfillment plan using the locations 702-704 and a fulfillment plan using one or more locations outside of the cluster, such as the location 700.

Figure 8:
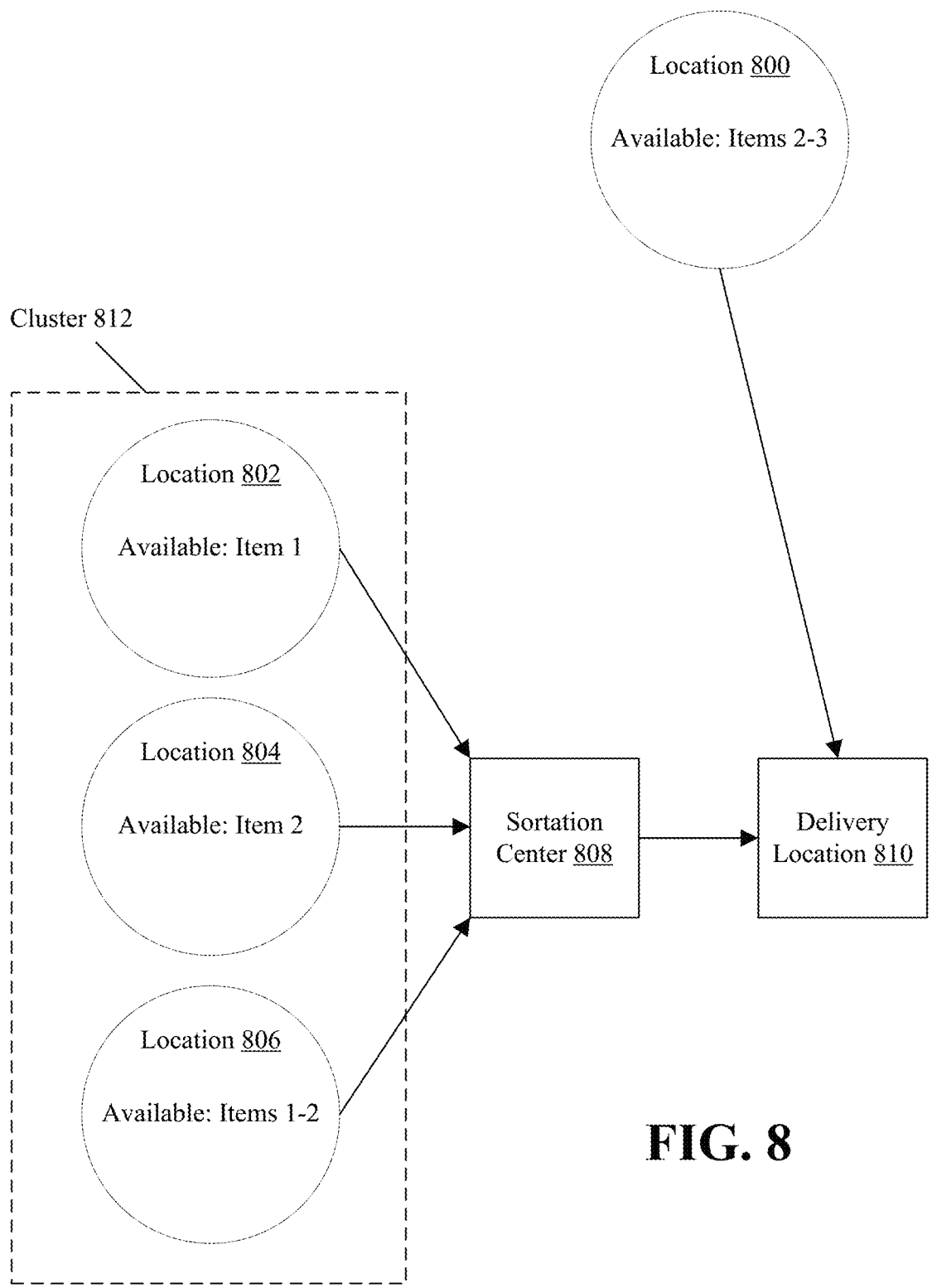
FIG. 8 illustrates a schematic diagram of an example application of aspects of the present disclosure.

FIG. 8 illustrates a schematic diagram of another example application of aspects of the present disclosure. The example of FIG. 8 includes locations 800-806, a sortation center 808, and a customer delivery location 810. In the example of FIG. 8, the locations 802-806 can form a cluster 812. In the example of FIG. 8, the order management tool 202 may receive an order that includes Item 1-3, and that requests shipment to the customer delivery location 810, which can be in the service area of the cluster 812. In some embodiments, the order management tool 202 can generate a fulfillment plan for the order. However, unlike in the example of FIG. 7, the cluster 812 of FIG. 8 cannot fulfill the order requirements, because, for example, Item 3 is not present at any store in the cluster 812. Therefore, the order management tool 202 can, in some embodiments, generate a fulfillment plan using one or more locations outside of the cluster 812, such as the location 800. In some examples, the fulfillment plan may indicate that the location 800 is the origin location for each item of the order. However, in the example of FIG. 8, the order management tool 202 can partially allocate the order within the cluster 812 and partially allocate the order to one or more locations outside of the cluster. For example, the order management tool 202 can, in the example of FIG. 8, allocate the delivery of Items 1-2 to locations within the cluster and the delivery of Item 3 to the location 800. Thus, in some examples, the fulfillment plan may indicate that a combination of the location 800 and one or more locations of the cluster are the origin locations for the items of the order.

As illustrated in the examples of FIGS. 7-8, the order management tool 202 can, in some embodiments, generate a fulfillment plan using locations within a cluster when it is possible to do so (e.g., when all the items of the order are available and when other order requirements are met using locations within the cluster), thereby leveraging the cluster to, for example, fulfill orders that are sent to locations within a service area associated with the cluster. But the order management tool 202 can, in some examples, resort to using locations outside of the cluster if, for example, one or more items are not available, or are not available within a certain time, within the cluster.

Figure 9:
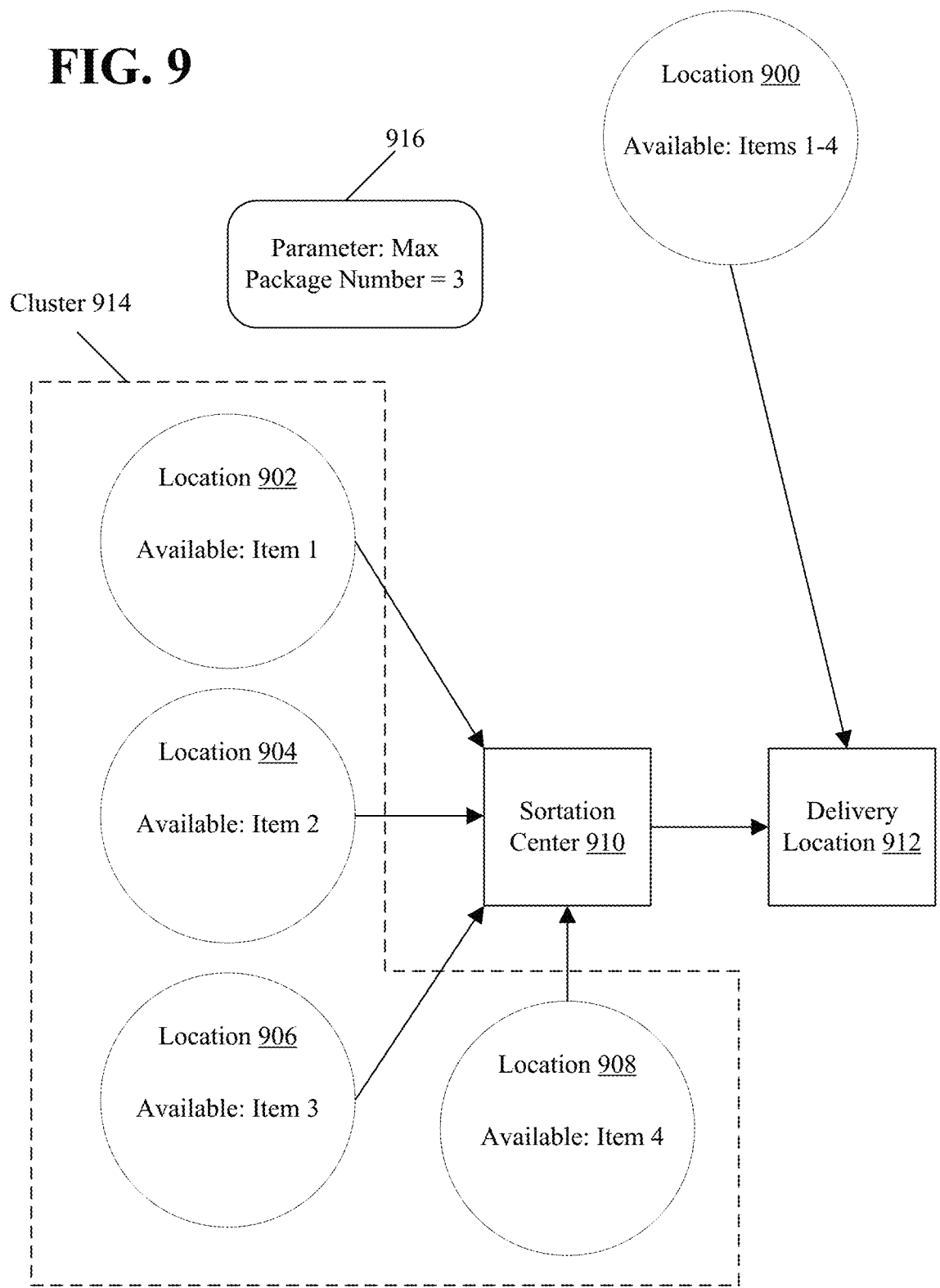
FIG. 9 illustrates a schematic diagram of an example application of aspects of the present disclosure.

FIG. 9 illustrates a schematic diagram of another example application of aspects of the present disclosure. The example of FIG. 9 includes locations 900-908, a sortation center 910, and a customer delivery location 912. In the example of FIG. 9, the locations 902-908 can form a cluster 914. Furthermore, in the example of FIG. 9, the order management tool 202 has been configured with a parameter 916 to not generate a fulfillment plan that would result in more packages being sent to a customer delivery location than a threshold number. In the example of FIG. 9, the maximum number of packages is three. As described above, the order management tool 202 can account for parameters and rules when generating a fulfillment order, in addition to requiring that each item of an order be available.

In the example of FIG. 9, the order management tool 202 may receive an order that includes Item 1-4, and that requests shipment to the customer delivery location 912, which can be in the service area of the cluster 914. In generating a fulfillment plan for the order, the order management tool 202 can, in some embodiments, determine that the cluster does not fulfill the order requirements, because selecting the locations 902-908 as the origin locations for Items 1-4, respectively, may, in some examples, result in more than three packages being sent to a customer. Instead, the order management tool 202 may, in some embodiments, generate a fulfillment plan using one or more locations outside of the cluster, such as the location 900. For example, the order management tool 202 may select the location 900 as the origin location for each of the items 1-4, or the order management tool 202 may select a combination of the location 900 and one or more of the locations 902-908 as origin locations. In addition to the example of FIG. 9, the order management tool 202 can, as described above, similarly account for other parameters or rules when determining whether a cluster fulfills order requirements and when generating a fulfillment plan.

FIGS. 10-15 illustrate example user interfaces that can be used by aspects of the present disclosure. For example, the user interfaces of the FIGS. 10-15 can be part of the configurator 302 of the order management tool 202 or another aspect of the order management tool 202. The order management tool 202 can include, or be configured to generate, more or less user interfaces than those illustrated in FIGS. 10-15. Furthermore, the example user interfaces of the FIGS. 10-15 can include more or less components than those illustrated, and they can have different layouts or configurations. For example, the user interfaces of FIGS. 10-15 may have more options for navigating the user interfaces and for searching and organizing data within the user interfaces.

Figure 10:
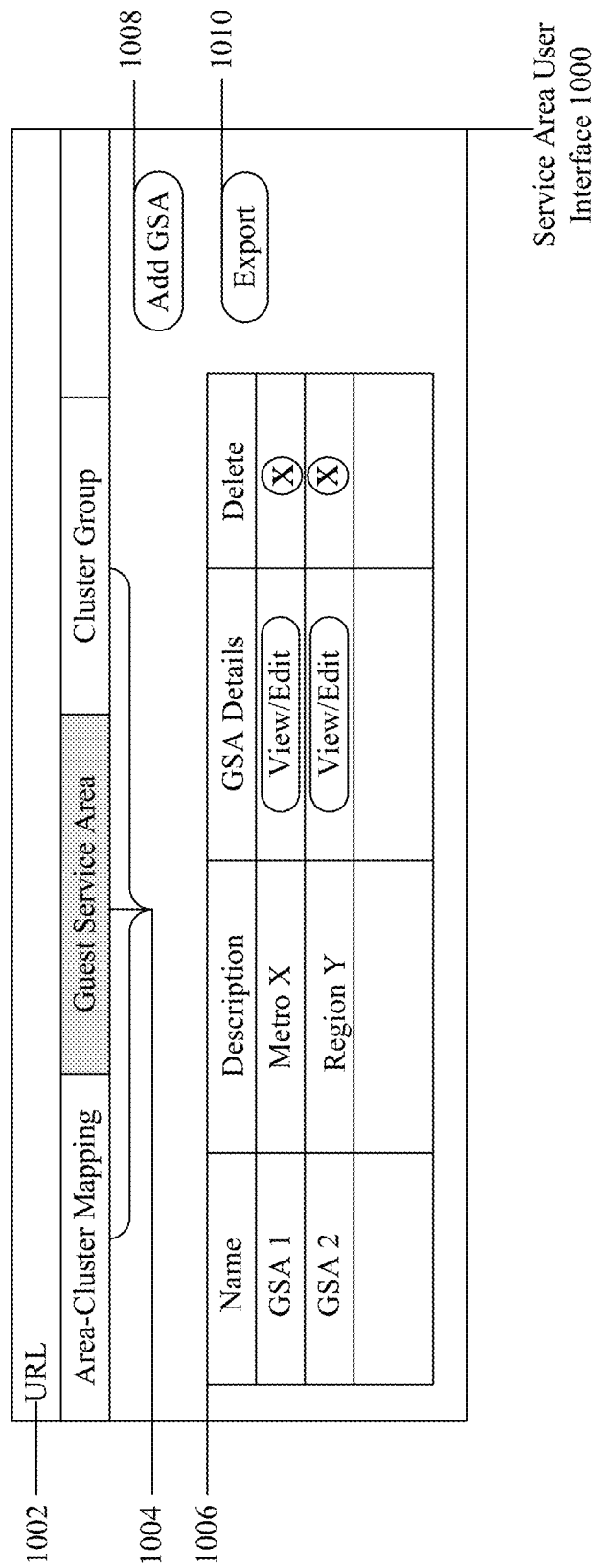
FIG. 10 illustrates an example service area user interface.

FIG. 10 illustrates an example service area user interface 1000. The service area user interface 1000 includes, in the example of FIG. 10, a URL 1002, a menu 1004, service area data 1006, an add service area option 1008, and an option to export data 1010. In some embodiments, the service area user interface 1000 can be accessed over the internet or another network; in such embodiments, a user may use the URL 1002 to access the service area interface 1000 or other user interfaces described below in connection with FIGS. 11-15.

The menu 1004 can include one or more options for navigating through one or more user interfaces. In the examples of FIGS. 10-15, the menu 1004 can include an Area-Cluster Mapping option, a Guest Service Area option, and a Cluster Group option. The Area-Cluster Mapping option may, in some examples, include user interfaces related to mappings between clusters and service areas, as well as characteristics of such mappings. Example user interfaces of the Area-Cluster Mapping option are described below in connection with FIGS. 14-15. The Guest Service Area option may, in some examples, include user interfaces related to service areas, as is described in connection with FIGS. 10-11. A guest service area (GSA) can be, in some examples, another term for a service area. The Cluster Group option may, in some examples, include user interfaces related to clusters, as is described in connection with FIGS. 12-13.

The service area data 1006 can include data related to one or more service areas. In FIG. 10, for example, the service area data 1006 can be a table that includes, for each service area, a name, description, an option to view or edit the service area, and an option to delete the service area. In FIG. 10, for example, the service area data 1006 includes information related to two service areas, Guest Service Area (GSA) 1 and Guest Service Area (GSA) 2, which are described as being services areas related to Metro X and Region Y, respectively. In other examples, the service area data 1006 can include data related to more service areas, include more or less data for those service areas, and take a form other than a table. The add service area option 1008 can be, for example, a button that, when selected by a user, may cause a user interface for adding a service area to be displayed. By selecting the option to export data 1010, a user can, for example, share or export some data of the edit service user interface 1000. Although only illustrated in the example of FIG. 10, an option to export or share data can also, in some embodiments, be available in the FIGS. 11-15.

Figure 11:
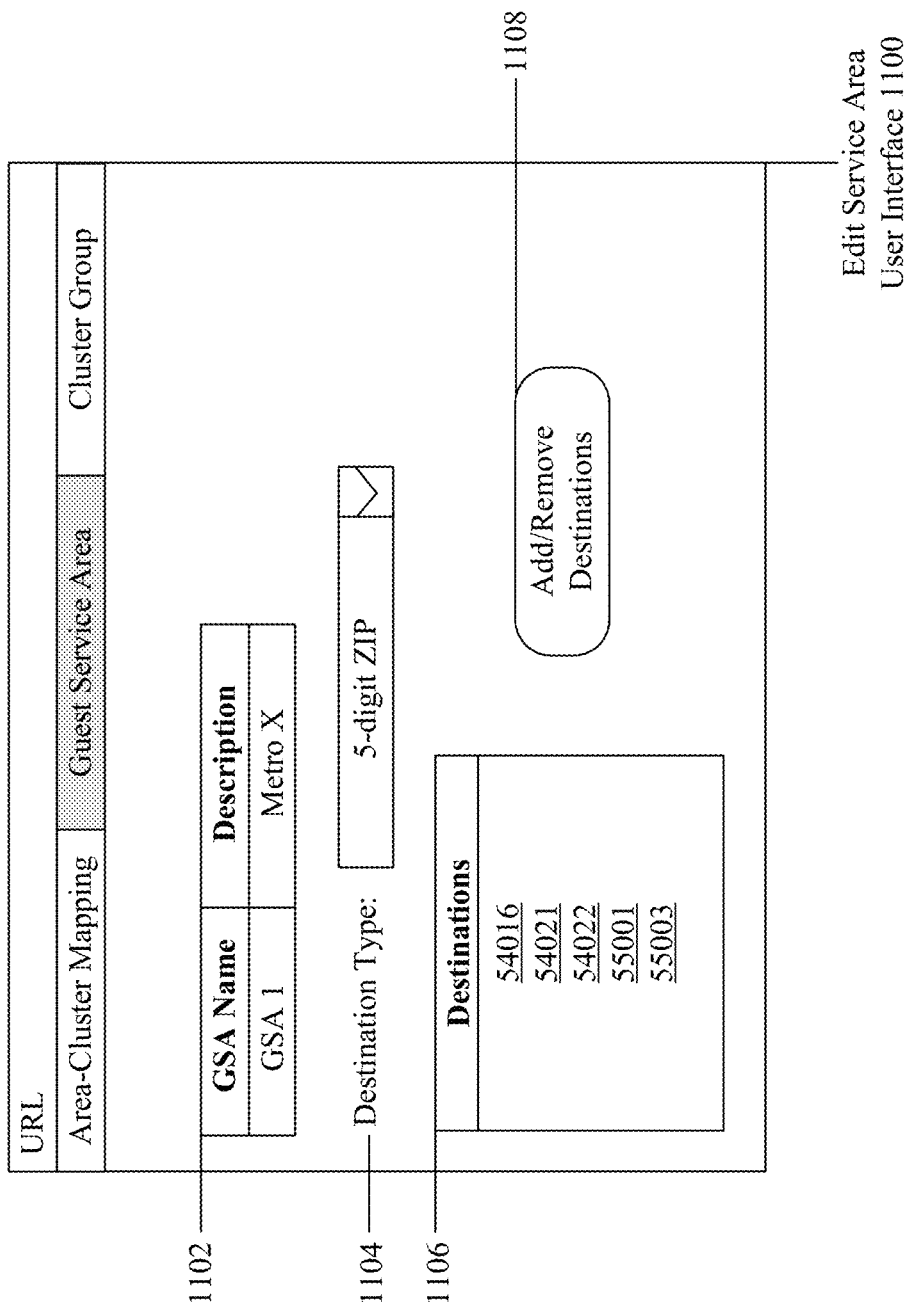
FIG. 11 illustrates an example edit service area user interface.

FIG. 11 illustrates an example edit service area user interface 1100. The edit service area user interface 1100 may displayed, for example, in response to a user selecting an option to edit or view a service area in the service area data 1006 of FIG. 10. In FIG. 11, for example, the edit service area user interface 1100 can include selected service area details 1102, a destination type input field 1104, destinations 1106, and an option for adding or removing destination 1108. The selected service area details 1102 can include, for example, information related to the service area, such as its name, an identifier, a description, or other data.

As described above, a service area can include, in some examples, a geographic region. The destination type input field 1104 can be used to determine how an area covered by the service area is to be defined. For example, in FIG. 11, the destination type is selected to be five-digit ZIP codes; thus, the selected service area (e.g., GSA 1) can be defined by using one or more 5-digit zip codes. In other examples, the destination type can be different, such as a different way to construct a geographic area. For example, the destination type could be neighborhoods, cities, counties, states, regions, sets of coordinates, or other ways to define an area.

The destinations 1106 can be one or more destinations or areas that are included in the service area. The form of the destinations 1106 can be determined based, for example, on what is selected in the destination type input field 1104. Therefore, in the example of FIG. 11, the destinations 1106 can include one or more five-digit ZIP codes, and the service area (e.g., GSA 1) can include an area that is coextensive with the destinations 1106. By selecting the option for adding or removing destinations 1108, a user can, for example, add a destination to the destinations 1106 or remove a destination from the destinations 1106.

Figure 12:
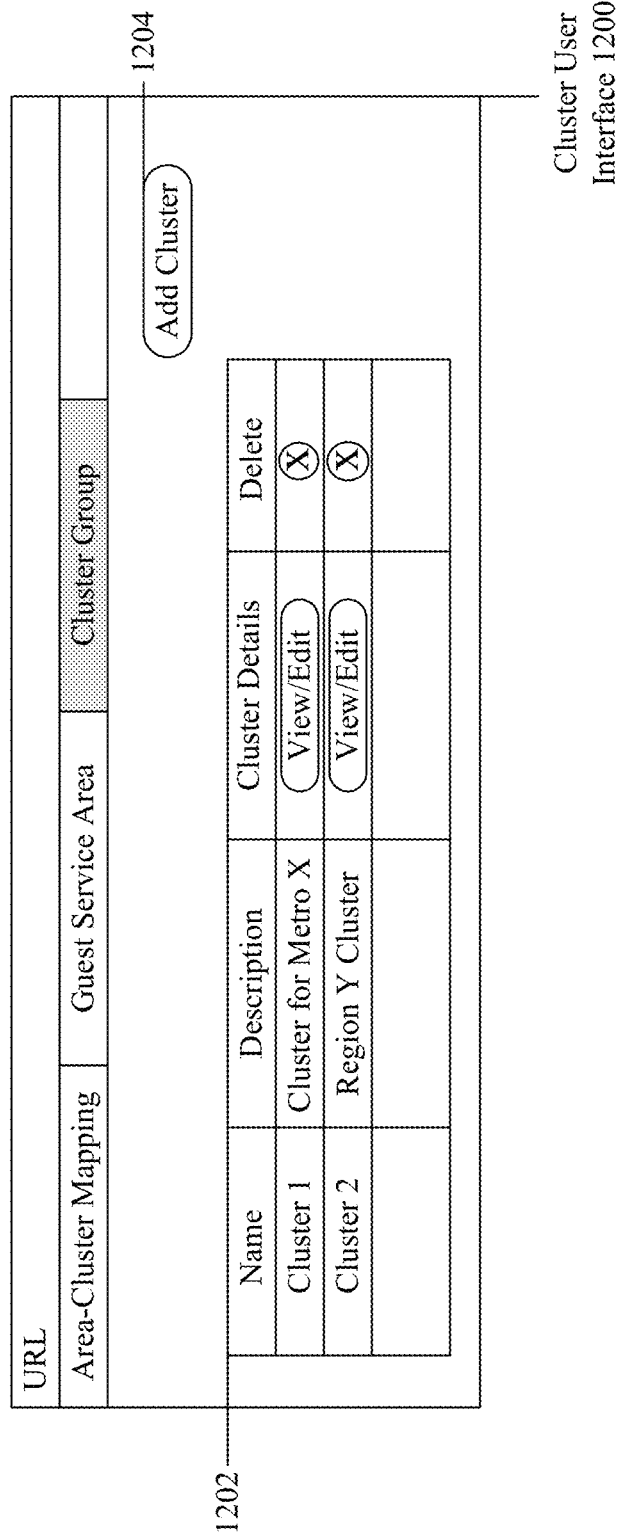
FIG. 12 illustrates an example cluster user interface.

FIG. 12 illustrates an example cluster user interface 1200. The cluster user interface 1200 can be displayed, for example, in response to a user selecting the Cluster Group option from the menu. In FIG. 12, for example, the cluster user interface 1200 can include cluster data 1202 and an option to add a cluster 1204. The cluster data 1202 can include data related to one or more clusters. For example, the cluster data 1202 may be a table that, for each cluster, includes data for a cluster name and description, as well as an option to view or edit a cluster and an option to delete a cluster. In other examples, the cluster data 1202 can include data related to more clusters, include more or less data for the clusters, and take a form other than a table. In response to a user selecting the option to add a cluster 1204, a different user interface may, in some embodiments, be displayed for adding a cluster.

Figure 13:
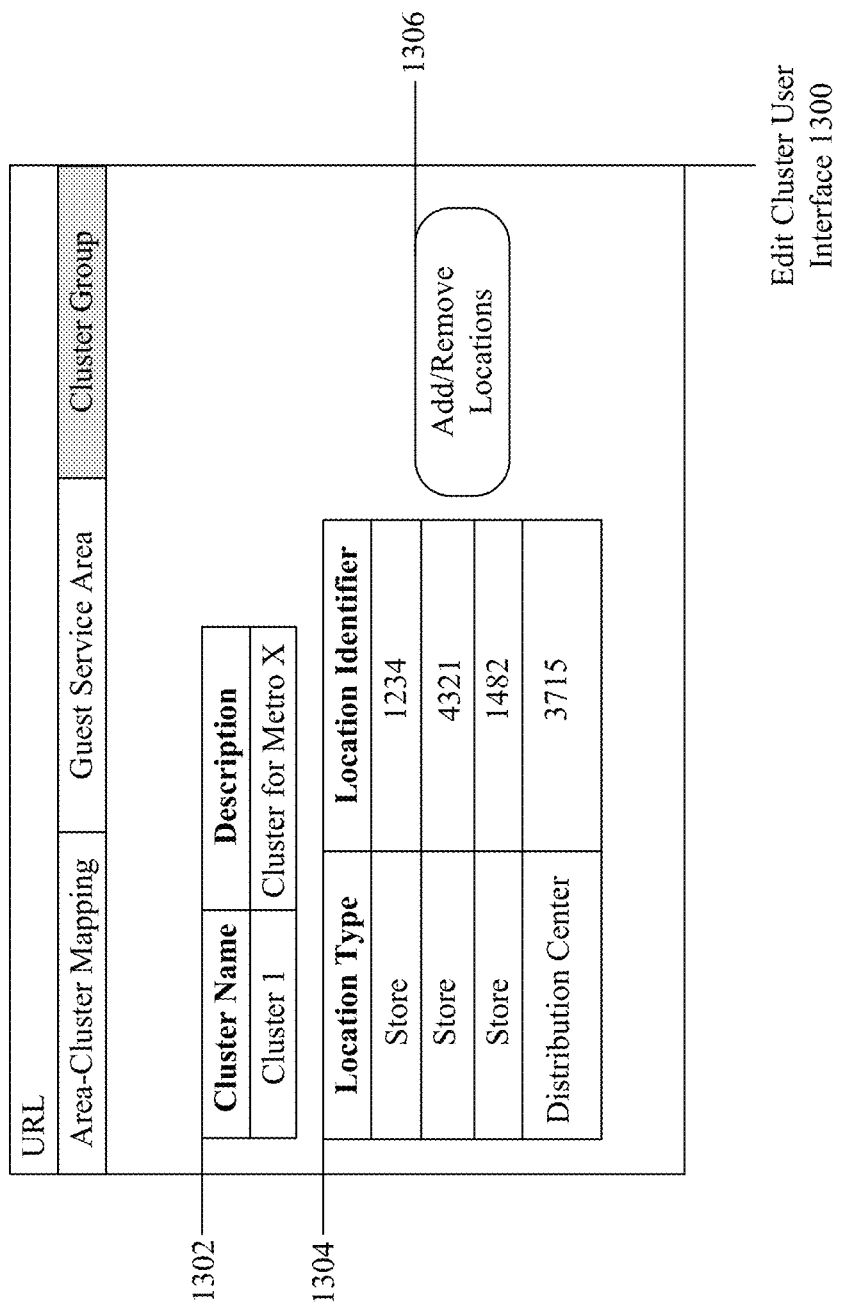
FIG. 13 illustrates an example edit cluster user interface.

FIG. 13 illustrates an example edit cluster user interface 1300. The edit cluster user interface 1300 may displayed, for example, in response to a user selecting to view or edit a cluster in the cluster data 1202 of FIG. 12. The edit cluster user interface 1300 can include, for example, selected cluster details 1302, cluster location data 1304, and an option to add or remove locations 1306. The selected cluster details 1302 can include, for example, a cluster name, description, identifier, or other information related to the cluster.

As described above, a cluster can, in some examples, be a group of two or more locations, which can be, for example, stores, distributions centers, sortation centers or other locations. The cluster location data 1304 can include information related to these two or more locations of the selected cluster. For example, the cluster location data 1304 can, for each location of the cluster, include a location name, a location type, a location identifier, a location's geographic position, and other information related to the location. By selecting the option to add or remove locations 1306, a user can, for example, add a location to the selected cluster or remove a location from the selected cluster, thereby adding or removing data from the cluster location data 1304.

FIG. 14 illustrates an example area-cluster mapping user interface 1400. The area-cluster mapping user interface 1400 may be displayed in response, for example, to a user selecting the Area-Cluster Mapping option in the menu. In FIG. 14, for example, the area-cluster mapping user interface 1400 can include area-cluster mapping data 1402 and an option to add a mapping 1404.

The area-cluster mapping data 1402 can include data related to one or more pairings of service areas (e.g., described in connection with FIGS. 10-11) with one or more clusters (e.g., described in connection with FIGS. 12-13). As described above, a cluster can cover a geographical area and, in some embodiments, that geographical area can be determined based on one or more service areas that the cluster is mapped to. In the example of FIG. 14, the area-cluster mapping data 1402 can be a table that, for each mapping, can include a mapping name, a service area name, a cluster name, an option to view or edit the mapping, and other data related to the area-cluster mapping, such as a sortation center that the service area, cluster, or mapping is associated with. In other examples, the area-cluster mapping data 1402 can include more mappings, can include more or less data than shown in the example of FIG. 14, can include an option to delete a mapping, or can be configured differently. By selecting the option to add a mapping 1404, a user can, for example, use a different user interface to create a new mapping between a service area and a cluster.

Figure 15:
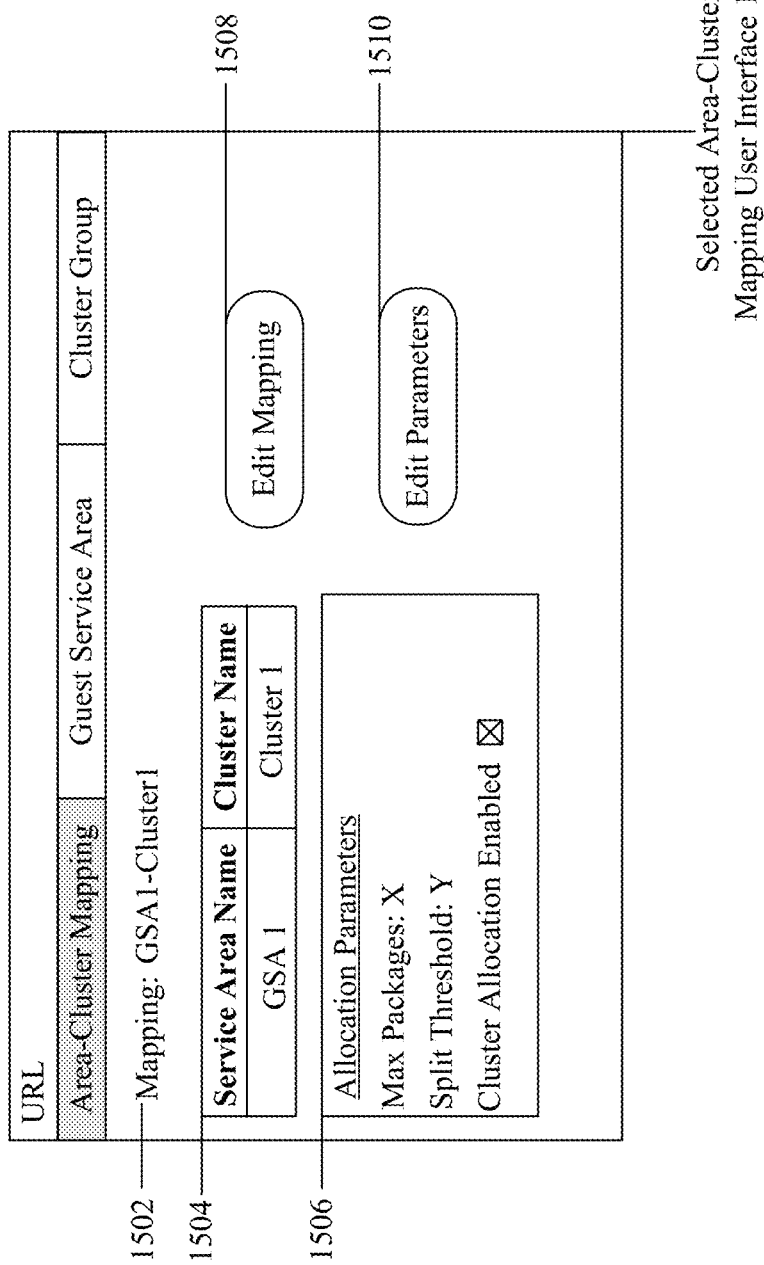
FIG. 15 illustrates an example selected area-cluster mapping user interface.

FIG. 15 illustrates an example selected area-cluster mapping user interface 1500. The selected area-cluster mapping user interface 1500 can be displayed, for example, in response to a user selecting to view or edit a mapping in the area-cluster mapping data 1402 of FIG. 14. In FIG. 15, for example, the selected area-cluster mapping user interface 1500 can include general mapping information 1502, mapping data 1504, parameters 1506, an option to edit a mapping 1508, and an option to edit parameters 1510. The general mapping information 1502 can include, for example, a name of a the selected area-cluster mapping. The mapping data 1504 can include, for example, data related to the area-cluster mapping, such as data related to one or more service areas, clusters, carrier information, metadata, or other information related to the selected area-cluster mapping.

The parameters 1506 can include, for example, one or more rules or parameters related to the selected area-cluster mapping, or the service area or cluster associated with the mapping. These parameters can be used, for example, when determining whether and how to allocate an order to a cluster. For example, the parameters 1506 can, as described in connection with FIG. 9, include a parameter that indicates the maximum of number packages that a cluster will be permitted to send to fulfill an order. The parameters 1506 may also include a split threshold, which can be, for example, a number of packages divided by a number of items in an order. In some examples, items of an order may be allocated depending on the split threshold. Furthermore, in some examples, the parameters 1506 may include an option for selecting whether to use cluster allocation for the selected area-cluster mapping. By selecting the option to edit a mapping 1508, a user may edit one or more aspects of the selected area-cluster mapping. For example, the user may add or remove a service area or a cluster, or the user may alter other data or aspects of the area-cluster mapping. By selecting the option to edit parameters 1510, a user may edit or remove one or more of the parameters 1506, or the user can add a new parameter to the parameters 1506.

Figure 16:
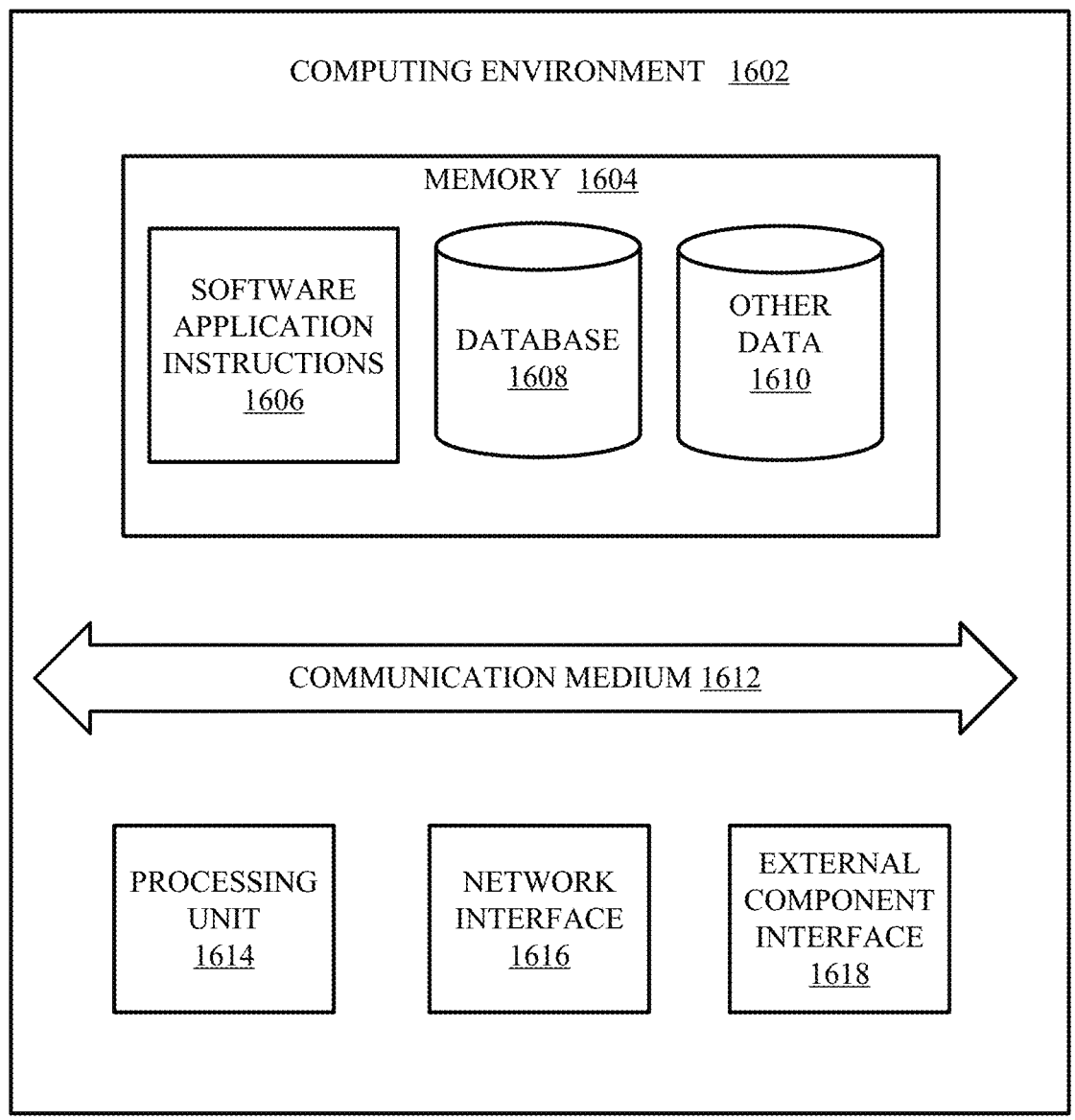
FIG. 16 illustrates an example block diagram of a computing system.

FIG. 16 illustrates an example system 1600 with which disclosed systems and methods can be used. For example, the following can be implemented in one or more systems 1000 or in one or more systems having one or more components of the system 1600: the order management tool 202, the planning system 204, the administrator 206, the fulfillment system 208, the checkout system 210, the configurator 302, the location interface 304, the order allocator 306, the order manager 308, and other aspects of the present disclosure described herein.

In an example, the system 1600 can include a computing environment 1602. The computing environment 1602 can be a physical computing environment, a virtualized computing environment, or a combination thereof. The computing environment 1602 can include memory 1604, a communication medium 1612, one or more processing units 1614, a network interface 1616, and an external component interface 1618.

The memory 1604 can include a computer readable storage medium. The computer storage medium can be a device or article of manufacture that stores data and/or computer-executable instructions. The memory 1604 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1604 can store various types of data and software. For example, as illustrated, the memory 1604 includes software application instructions 1606, one or more databases 1608, as well as other data 1610.

The communication medium 1612 can facilitate communication among the components of the computing environment 1602. In an example, the communication medium 1612 can facilitate communication among the memory 1604, the one or more processing units 1614, the network interface 1616, and the external component interface 1618. The communications medium 1612 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1614 can include physical or virtual units that selectively execute software instructions, such as the software application instructions 1606. In an example, the one or more processing units 1614 can be physical products comprising one or more integrated circuits. The one or more processing units 1614 can be implemented as one or more processing cores. In another example, one or more processing units 1614 are implemented as one or more separate microprocessors. In yet another example embodiment, the one or more processing units 1614 can include an application-specific integrated circuit (ASIC) that provides specific functionality. In yet another example, the one or more processing units 1614 provide specific functionality by using an ASIC and by executing computer-executable instructions.

The network interface 1616 enables the computing environment 1602 to send and receive data from a communication network (e.g., the networks 216a—c). The network interface 1616 can be implemented as an Ethernet interface, a token-ring network interface, a fiber optic network interface, a wireless network interface (e.g., Wi-Fi), or another type of network interface.

The external component interface 1618 enables the computing environment 1602 to communicate with external devices. For example, the external component interface 1618 can be a USB interface, Thunderbolt interface, a Lightning interface, a serial port interface, a parallel port interface, a PS/2 interface, or another type of interface that enables the computing environment 1602 to communicate with external devices. In various embodiments, the external component interface 1618 enables the computing environment 1602 to communicate with various external components, such as external storage devices, input devices, speakers, modems, media player docks, other computing devices, scanners, digital cameras, and fingerprint readers.

Although illustrated as being components of a single computing environment 1602, the components of the computing environment 1602 can be spread across multiple computing environments 1602. For example, one or more of instructions or data stored on the memory 1604 may be stored partially or entirely in a separate computing system 1600 that is accessed over a network.

Depending on the size and scale of the computing environment 1602, it may be advantageous to include one or more load balancers to balance traffic across multiple physical or virtual machine nodes.

Aspects of the system 1600 and the computing environment 1602 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full system 1600, such that portal can run and schedule jobs and serve the portal user interface as long as a single node remains functional. The environment 1602 may include monitoring technology to determine when a node is not functioning so an appropriate action can be taken.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An order management tool comprising:
a processing unit;
a memory communicatively connected to the processing unit, the memory storing instructions executable by the processing unit wherein the instructions, when executed by the processing unit, cause the order management tool to:

receive logistics data comprising information regarding a plurality of order fulfillment locations, wherein two or more locations of the plurality of locations belong to a cluster, wherein receiving the logistics data comprises:
  displaying a user interface; and
  receiving, via the user interface, a selection of the two or more locations to include the two or more locations in the cluster;
receive an order comprising two or more items; and
generate, using the logistics data, a fulfillment plan for the order, wherein generating, using the logistics data, the fulfillment plan for the order comprises:
  determining whether the cluster fulfills the order, wherein determining whether the cluster fulfills the order comprises determining that each item of the two or more items is available in at least one location of the two or more locations; and
  in response to determining that the cluster fulfills the order, selecting, for each of the two or more items, one of the two or more locations belonging to the cluster as an origin location for the item, the fulfillment plan including a first origin location of the two or more locations for a first item of the two or more items and a second origin location of the two or more locations for a second item of the two or more items.

2. The order management tool of claim 1,
wherein a majority of the two or more locations belonging to the cluster are retail stores.

3. The order management tool of claim 1,
wherein the cluster is associated with a sortation center; and
wherein the fulfillment plan includes, for each of the two or more items, a shipment from the origin location to the sortation center.

4. The order management tool of claim 1,
wherein the cluster covers a geographical area;
wherein the order comprises a customer delivery location; and
wherein the instructions, when executed, further cause the order management tool to:
  determine whether the customer delivery location is located within the geographical area; and
  wherein generating, using the logistics data, the fulfillment plan for the order is performed in response to determining that the customer delivery location is located within the geographical area.

5. The order management tool of claim 1, wherein determining that the cluster fulfills the order further comprises determining that a number of packages used to ship the two or more items from the two or more locations belonging to the cluster to a customer delivery location is not above a maximum number of packages.

6. The order management tool of claim 1, wherein determining that the cluster fulfills the order further comprises determining, for each of the two or more items, that an estimated delivery time for a shipment of the item from the origin location to a customer delivery location is not above a maximum delivery time.

7. The order management tool of claim 1, wherein generating, using the logistics data, the fulfillment plan further comprises, in response to determining that the cluster does not fulfill the order, selecting, from the plurality of locations, a location that does not belong to the cluster as the origin location for all of the one or more items.

8. The order management tool of claim 1, wherein the instructions, when executed, further cause the order management tool to:

generate a second fulfillment plan for the order;
select, based on a comparison of the fulfillment plan and the second fulfillment plan, the fulfillment plan or the second fulfillment plan as a selected fulfillment plan; and
transmit the selected fulfillment plan to a fulfillment system;
wherein generating the second fulfillment plan for the order comprises selecting, from the plurality of locations, a location that does not belong to the cluster as an origin location for at least one of the two or more items.

9. The order management of claim 8, wherein selecting, based on the comparison of the fulfillment plan and the second fulfillment plan, the fulfillment plan or the second fulfillment plan as the selected fulfillment plan is performed by comparing one or more of a delivery cost or a delivery time of the fulfillment plan and the second fulfillment plan.

10. The order management tool of claim 1,
wherein the user interface comprises one or more input fields for defining one or more of the cluster or a geographical area covered by the cluster; and
wherein the one or more input fields for defining one or more of the cluster or the geographical area covered by the cluster include one or more of an input field for inputting one or more ZIP codes or an input field for inputting one or more locations of the plurality of locations.

11. The order management tool of claim 1, wherein the instructions, when executed, further cause the order management tool to transmit the fulfillment plan to a fulfillment system, thereby effecting automatic processing of the order in accordance with the fulfillment plan to initiate shipment of the one or more items.

12. The order management tool of claim 1,
wherein the fulfillment plan comprises an estimated delivery date;
wherein generating, using the logistics data, the fulfillment plan for the order further comprises determining the estimated delivery date; and
wherein the instructions, when executed, further cause the order management tool to transmit the estimated delivery date to a user device.

13. A method for managing orders comprising:
receiving logistics data, the logistics data comprising a plurality of clusters, wherein each cluster of the plurality of clusters covers a geographical area and each cluster of the plurality of clusters comprises two or more locations;
receiving an order comprising two or more items and a customer delivery location;
selecting one of the plurality of clusters based on the customer delivery location, wherein the customer delivery location is located within a geographical area covered by the selected cluster;
determining whether the selected cluster fulfills the order, wherein determining whether the selected cluster fulfills the order comprises determining that each of the two or more items is available in at least one location of the two or more locations belonging to the cluster; and
in response to determining that the selected cluster fulfills the order, selecting, for each of the two or more items, one of the two or more locations belonging to the cluster as an origin location for the item, wherein a first origin location of the two or more locations belonging to the cluster is selected for a first item of the two or more items and a second origin location of the two or more locations belonging to the cluster is selected for a second item of the two or more items.

14. The method of claim 13,
wherein the selected cluster is associated with a sortation center; and
wherein a majority of the two or more locations belonging to the selected cluster are retail stores.

15. The method of claim 13, further comprising, in response to determining that the selected cluster does not fulfill the order, selecting a location that does not belong to the selected cluster as the origin location for all of the two or more items.

16. The method of claim 13, wherein determining whether the selected cluster fulfills the order further comprises determining that a delivery cost is below a threshold amount.

17. A system for determining a fulfillment plan for delivery orders, the system comprising:
   a planning system;
   a checkout system;
   a fulfillment system; and
   an order management tool comprising a processor and a memory, the memory storing instructions that, when executed by the processor, cause the processor to:
      receive logistics data from the planning system;
      receive an order from the checkout system, the order comprising two or more items;
      generate, using the logistics data, a fulfillment plan for the order; and
      transmit the fulfillment plan to the fulfillment system;
   wherein the logistics data comprises a plurality of locations;
   wherein two or more locations of the plurality of locations belong to a cluster; and
   wherein generating, using the logistics data, the fulfillment plan for the order comprises:
      determining whether the cluster fulfills the order, wherein determining whether the cluster fulfills the order comprises determining that each item of the two or more items is available in at least one location of the two or more locations; and
      in response to determining that the cluster fulfills the order, selecting, for each of the two or more items, one of the two or more locations belonging to the cluster as an origin location for the item, wherein a first origin location of the two or more locations belonging to the cluster is selected for a first item of the two or more items and a second origin location of the two or more locations belonging to the cluster is selected for a second item of the two or more items.

18. The order management tool of claim 1,
wherein receiving the logistics data comprises receiving, via the user interface, a mapping of the cluster to a geographical area;
wherein the order further comprises a customer delivery location; and
wherein generating the fulfillment plan comprises determining that the geographical area mapped to the cluster covers the customer delivery location.

19. The order management tool of claim 18, wherein the instructions, when executed by the processing unit, further cause the order management tool to receive, via the user interface, a modification of the cluster, the modification comprising adding a location to the two or more locations or removing one of the two or more locations.

* * * * *